United States Patent
Sun et al.

(10) Patent No.: US 10,863,542 B2
(45) Date of Patent: Dec. 8, 2020

(54) LISTEN-BEFORE-TALK AND CHANNEL RESERVATION FOR MILLIMETER WAVE SYSTEMS

(71) Applicant: QUALCOMM Incorporated, San Diego, CA (US)

(72) Inventors: Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 16/133,163

(22) Filed: Sep. 17, 2018

(65) Prior Publication Data

US 2019/0090279 A1 Mar. 21, 2019

Related U.S. Application Data

(60) Provisional application No. 62/560,473, filed on Sep. 19, 2017.

(51) Int. Cl.
*H04W 74/08* (2009.01)
*H04W 16/14* (2009.01)
(Continued)

(52) U.S. Cl.
CPC ....... *H04W 74/0816* (2013.01); *H04L 5/0055* (2013.01); *H04W 16/14* (2013.01);
(Continued)

(58) Field of Classification Search
CPC combination set(s) only.
See application file for complete search history.

(56) References Cited

U.S. PATENT DOCUMENTS

2016/0105897 A1* 4/2016 Liu ............... H04W 72/1226
370/235
2016/0227578 A1* 8/2016 Lee ............... H04W 74/004
(Continued)

FOREIGN PATENT DOCUMENTS

WO WO-2014172306 A2 10/2014

OTHER PUBLICATIONS

Huawei et al., "Coexistence and Channel Access for NR Unlicensed Band Operation", R1-1715581, 3rd Generation Partnership Project (3GPP), Mobile Competence Centre, 650, Route Des Lucioles, F-06921 Sophia-Antipolis Cedex, France, vol. RAN WG1, No. Nagoya, Japan; Sep. 18, 2017-Sep. 21, 2017 Sep. 17, 2017, XP051339048, Retrieved from the Internet: URL: http://www.3gpp.org/ftp/Meetings_3GPP_SYNC/RAN1/Docs/[retrieved on Sep. 17, 2017], 5 pages.
(Continued)

*Primary Examiner* — Yee F Lam
(74) *Attorney, Agent, or Firm* — Holland & Hart LLP

(57) ABSTRACT

Methods, systems, and devices for wireless communications are described. A method may include receiving, from a base station, a pre-grant message indicating that a downlink transmission is available for transmission to a user equipment (UE) on a first radio frequency (RF) spectrum band, and performing a listen-before-talk (LBT) procedure. The UE may then transmit, based on the LBT procedure indicating a clear channel, a channel reservation signal on a second RF spectrum band, and transmit, to the base station, a response to the pre-grant message on the second RF spectrum band. Another method may include a base station transmitting a pre-grant message to the UE, and receiving a response to the pre-grant message on a second RF spectrum band. The base station may then transmit the downlink
(Continued)

transmission to the UE using one or more of a set of transmit beams on a first RF spectrum band.

28 Claims, 17 Drawing Sheets

(51) Int. Cl.
| | |
|---|---|
| *H04W 72/14* | (2009.01) |
| *H04W 28/26* | (2009.01) |
| *H04W 72/04* | (2009.01) |
| *H04L 5/00* | (2006.01) |
| *H04L 5/14* | (2006.01) |

(52) U.S. Cl.
CPC ....... *H04W 28/26* (2013.01); *H04W 72/0446* (2013.01); *H04W 72/14* (2013.01); *H04L 5/14* (2013.01); *H04W 72/042* (2013.01)

(56) References Cited

U.S. PATENT DOCUMENTS

| | | | | |
|---|---|---|---|---|
| 2016/0234706 | A1* | 8/2016 | Liu | H04L 5/0048 |
| 2016/0309354 | A1* | 10/2016 | Yerramalli | H04W 72/0473 |
| 2016/0330678 | A1* | 11/2016 | Yoon | H04W 74/006 |
| 2017/0013470 | A1* | 1/2017 | Sun | H04W 74/0816 |
| 2017/0013479 | A1* | 1/2017 | Sun | H04W 24/08 |
| 2017/0111931 | A1* | 4/2017 | Damnjanovic | H04W 74/0825 |
| 2017/0290048 | A1* | 10/2017 | Amuru | H04W 74/0808 |
| 2017/0294958 | A1* | 10/2017 | Ahn | H04W 28/26 |
| 2017/0339530 | A1 | 11/2017 | Maaref | |
| 2018/0020359 | A1* | 1/2018 | Belghoul | H04L 5/0062 |
| 2018/0027481 | A1* | 1/2018 | Xu | H04W 72/1226 370/252 |
| 2018/0070369 | A1 | 3/2018 | Papasakellariou | |
| 2018/0077725 | A1 | 3/2018 | Sun et al. | |
| 2018/0098335 | A1 | 4/2018 | Sun et al. | |
| 2018/0110057 | A1* | 4/2018 | Park | H04B 7/0404 |
| 2018/0115991 | A1* | 4/2018 | Yang | H04W 72/14 |
| 2018/0167848 | A1 | 6/2018 | Lei et al. | |
| 2019/0037509 | A1* | 1/2019 | Li | H04W 72/0406 |
| 2019/0053222 | A1* | 2/2019 | Bhorkar | H04W 72/1284 |
| 2019/0124687 | A1* | 4/2019 | Yang | H04L 5/0007 |
| 2019/0174554 | A1* | 6/2019 | Deenoo | H04W 76/27 |
| 2019/0200379 | A1* | 6/2019 | Wang | H04W 72/1268 |
| 2019/0268939 | A1* | 8/2019 | Yang | H04W 72/042 |

OTHER PUBLICATIONS

Interdigital et al., "NR Paging based on Paging Indication", 3GPP Draft; R1-1716260 (R15 NR WI AI 613 UE-Reponse-Driven Paging), 3rd Generation Partnership Project (3GPP), Mobile Competence Centre, 650, Route Des Lucioles, F-06921 Sophia-Antipolis Cedex, France, vol. RAN WG1, No. Nagoya, Japan; Sep. 18, 2017-Sep. 21, 2017 Sep. 17, 2017, XP051339717, Retrieved from the Internet: URL:http://www.3gpp.org/ftp/Meetings_3GPP_SYNC/RAN1/Docs/ [retrieved on Sep. 17, 2017], 4 pages.

International Search Report and Written Opinion—PCT/US2018/051547—ISA/EPO—Nov. 28, 2018.

* cited by examiner

LISTEN-BEFORE-TALK AND CHANNEL RESERVATION FOR MILLIMETER WAVE SYSTEMS

CROSS REFERENCES

The present Application for Patent claims the benefit of U.S. Provisional Patent Application No. 62/560,473 by SUN et al., entitled "LISTEN-BEFORE-TALK AND CHANNEL RESERVATION FOR MILLIMETER WAVE SYSTEMS," filed Sep. 19, 2017, assigned to the assignee hereof, and expressly incorporated herein.

BACKGROUND

The following relates generally to wireless communication, and more specifically to listen-before-talk (LBT) and channel reservation for millimeter wave (mmW) systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communication systems may support cross band pairing where different radio frequency (RF) spectrum bands, or different radio access technologies (RATs), or both are paired for uplink or downlink communications, or both. For example, some wireless communication systems may pair a mmW band (e.g., above 6 GHz, such as a band in the range from 30 GHz to 300 GHz) in the downlink with a sub-6 GHz (e.g., a band in the range less than 6 GHz) and/or mmW band in the uplink. Such pairings, however, may generate difficulties for providing channel reservation messages to wireless devices, including UEs and base stations. For example, some UEs may support communicating in both bands whereas other UEs may only support communicating in one band. In other examples, a wireless device may support downlink (but not uplink) in one band, and uplink (but not downlink) in another band. Moreover, the coverage area in a sub-6 GHz band may be different than the coverage area in a mmW band. Thus, improved techniques to support channel reservation procedures are desired.

SUMMARY

The described techniques relate to improved methods, systems, devices, or apparatuses that support listen-before-talk (LBT) and channel reservation for millimeter wave (mmW) systems. Generally, the described techniques provide for downlink transmission on a first radio frequency (RF) spectrum band and uplink transmission on a second RF spectrum band. The first RF spectrum band may be a sub-6 GHz band and may be an unlicensed or a shared access band. The second RF spectrum band may be a mmW band, and may be an unlicensed, or a shared access, or a licensed band. A base station may transmit a pre-grant message to a user equipment (UE) on the first RF spectrum band. The pre-grant message may indicate that a downlink transmission is available for transmission to the UE on the first RF spectrum band. Upon receiving the pre-grant message, the UE may perform an LBT procedure in the second RF spectrum band. The UE may then, based on a successful result of the LBT procedure indicating a clear channel, transmit a channel reservation signal on the second RF spectrum band. For example, the UE may transmit the channel reservation signal to a neighboring base station or neighboring UE, to indicate that the UE will be receiving a downlink transmission in the first RF spectrum band. The UE may therefore mitigate interference provided from the neighboring base station and/or UE that may also be operating (i.e., performing downlink and/or uplink transmissions) in the first RF spectrum band. The neighboring base station and/or UE may receive the channel reservation message from the UE on the second RF spectrum band and trigger to backoff for a duration of the downlink transmission. Upon transmitting the channel reservation message, after a successful LBT procedure, the UE may transmit a response to the pre-grant message on the second RF spectrum band to the base station. The base station may receive the pre-grant response message and transmit the downlink transmissions to the UE on the first RF spectrum band.

A method of wireless communication is described. The method may include receiving, from a base station, a pre-grant message indicating that a downlink transmission is available for transmission to the UE, where the downlink transmission is available for transmission on a first RF spectrum band; performing a LBT procedure based on receiving the pre-grant message; transmitting, based on the LBT procedure indicating a clear channel, a channel reservation signal on a second RF spectrum band; and transmitting, to the base station, a response to the pre-grant message on the second RF spectrum band.

An apparatus for wireless communication is described. The apparatus may include means for receiving, from a base station, a pre-grant message indicating that a downlink transmission is available for transmission to the UE, where the downlink transmission is available for transmission on a first RF spectrum band; means for performing a LBT procedure based on receiving the pre-grant message; means for transmitting, based on the LBT procedure indicating a clear channel, a channel reservation signal on a second RF spectrum band; and means for transmitting, to the base station, a response to the pre-grant message on the second RF spectrum band.

Another apparatus for wireless communication is described. The apparatus may include a processor, memory in electronic communication with the processor, and instructions stored in the memory. The instructions may be operable to cause the processor to receive, from a base station, a pre-grant message indicating that a downlink transmission is available for transmission to the UE, where the downlink transmission is available for transmission on a first RF spectrum band; perform a LBT procedure based on receiving the pre-grant message; transmit, based on the LBT procedure indicating a clear channel, a channel reservation signal on a second RF spectrum band; and transmit, to the base station, a response to the pre-grant message on the second RF spectrum band.

A non-transitory computer readable medium for wireless communication is described. The non-transitory computer-readable medium may include instructions operable to cause a processor to receive, from a base station, a pre-grant message indicating that a downlink transmission is available for transmission to the UE, where the downlink transmission is available for transmission on a first RF spectrum band; perform a LBT procedure based on receiving the pre-grant message; transmit, based on the LBT procedure indicating a clear channel, a channel reservation signal on a second RF spectrum band; and transmit, to the base station, a response to the pre-grant message on the second RF spectrum band.

Some examples of the method, apparatus, and non-transitory computer-readable medium described above may further include processes, features, means, or instructions for receiving the downlink transmission from the base station on the first RF spectrum band, the downlink transmission transmitted by the base station using one or more of a set of transmit beams on the first RF spectrum band. Some examples of the method, apparatus, and non-transitory computer-readable medium described above may further include processes, features, means, or instructions for transmitting, to the base station on the second RF spectrum band, one or more acknowledgement (ACK) or non-acknowledgment (NACK) messages in response to receiving the downlink transmission at the UE.

In some examples of the method, apparatus, and non-transitory computer-readable medium described above, the pre-grant message may be received in the first RF spectrum or the second RF spectrum. Some examples of the method, apparatus, and non-transitory computer-readable medium described above may further include processes, features, means, or instructions for performing the LBT procedure in the first RF spectrum band based on receiving the pre-grant message. Some examples of the method, apparatus, and non-transitory computer-readable medium described above may further include processes, features, means, or instructions for performing the LBT procedure in the second RF spectrum band based on receiving the pre-grant message. Some examples of the method, apparatus, and non-transitory computer-readable medium described above may further include processes, features, means, or instructions for performing a second LBT procedure in the second RF spectrum band, where transmitting the channel reservation signal may be based on the LBT procedure indicating the clear channel and the second LBT procedure indicating a second clear channel.

In some examples of the method, apparatus, and non-transitory computer-readable medium described above, the pre-grant message indicates a duration for a transmission opportunity (TxOP). In some examples of the method, apparatus, and non-transitory computer-readable medium described above, the channel reservation signal includes a preamble indicating the duration. In some examples of the method, apparatus, and non-transitory computer-readable medium described above, the LBT procedure includes a category 4 LBT, or a one-shot LBT, or a combination thereof. Some examples of the method, apparatus, and non-transitory computer-readable medium described above may further include processes, features, means, or instructions for frequency division duplexing an uplink carrier carrying the channel reservation signal.

Some examples of the method, apparatus, and non-transitory computer-readable medium described above may further include processes, features, means, or instructions for timing division duplexing an uplink carrier carrying the channel reservation signal. In some examples of the method, apparatus, and non-transitory computer-readable medium described above, the channel reservation transmission may be a physical uplink control channel (PUCCH) waveform. In some examples of the method, apparatus, and non-transitory computer-readable medium described above, the first RF spectrum band includes a RF spectrum band above 6 GHz and the second RF spectrum band includes a RF spectrum band below 6 GHz. In some examples of the method, apparatus, and non-transitory computer-readable medium described above, the first RF spectrum band includes an unlicensed or a shared access RF spectrum band and the second RF spectrum band includes an unlicensed or a shared access RF spectrum band or the licensed RF spectrum band. In some examples of the method, apparatus, and non-transitory computer-readable medium described above, the second RF spectrum band includes the licensed RF spectrum band, where the licensed RF spectrum band includes a frequency division duplexing (FDD) licensed or time division duplexing (TDD) licensed spectrum band.

In some examples of the method, apparatus, and non-transitory computer-readable medium, the pre-grant message is transmitted without performing a listen-before-talk (LBT) procedure to indicate a clear channel for the pre-grant message transmission.

In some examples of the method, apparatus, and non-transitory computer-readable medium, transmissions from the UE are received in a spectrum band other than the first spectrum band based at least in part on lacking an uplink reception capability in the first spectrum band.

A method of wireless communication is described. The method may include transmitting a pre-grant message to a UE indicating that a downlink transmission is available for transmission to the UE, where the downlink transmission is available for transmission on a first RF spectrum band; receiving, from the UE, a response to the pre-grant message on a second RF spectrum band; and transmitting, based on receiving the response to the pre-grant message, the downlink transmission to the UE using one or more of a set of transmit beams on the first RF spectrum band.

An apparatus for wireless communication is described. The apparatus may include means for transmitting a pre-grant message to a UE indicating that a downlink transmission is available for transmission to the UE, where the downlink transmission is available for transmission on a first RF spectrum band; means for receiving, from the UE, a response to the pre-grant message on a second RF spectrum band; and means for transmitting, based on receiving the response to the pre-grant message, the downlink transmission to the UE using one or more of a set of transmit beams on the first RF spectrum band.

Another apparatus for wireless communication is described. The apparatus may include a processor, memory in electronic communication with the processor, and instructions stored in the memory. The instructions may be operable to cause the processor to transmit a pre-grant message to a UE indicating that a downlink transmission is available for transmission to the UE, where the downlink transmission is available for transmission on a first RF spectrum band; receive, from the UE, a response to the pre-grant message on a second RF spectrum band; and transmit, based on receiving the response to the pre-grant message, the downlink transmission to the UE using one or more of a set of transmit beams on the first RF spectrum band.

A non-transitory computer readable medium for wireless communication is described. The non-transitory computer-readable medium may include instructions operable to cause a processor to transmit a pre-grant message to a UE indicating that a downlink transmission is available for transmission to the UE, where the downlink transmission is available for transmission on a first RF spectrum band; receive, from the UE, a response to the pre-grant message on a second RF spectrum band; and transmit, based on receiving the response to the pre-grant message, the downlink transmission to the UE using one or more of a set of transmit beams on the first RF spectrum band.

Some examples of the method, apparatus, and non-transitory computer-readable medium described above may further include processes, features, means, or instructions for transmitting the pre-grant message to the UE in the second RF spectrum band. Some examples of the method, apparatus, and non-transitory computer-readable medium described above may further include processes, features, means, or instructions for performing an LBT procedure in the second RF spectrum band, where the pre-grant message may be transmitted based on the LBT procedure indicating a clear channel. Some examples of the method, apparatus, and non-transitory computer-readable medium described above may further include processes, features, means, or instructions for transmitting the pre-grant message to the UE in the first RF spectrum band or the second RF spectrum band.

Some examples of the method, apparatus, and non-transitory computer-readable medium described above may further include processes, features, means, or instructions for receiving, from the UE on the second RF spectrum band, one or more ACK or NACK messages in response to transmitting the downlink transmission to the UE. In some examples of the method, apparatus, and non-transitory computer-readable medium described above, the pre-grant message indicates a duration for a TxOP.

Some examples of the method, apparatus, and non-transitory computer-readable medium described above may further include processes, features, means, or instructions for receiving, from a second UE, a channel reservation signal on the second RF spectrum band. Some examples of the method, apparatus, and non-transitory computer-readable medium described above may further include processes, features, means, or instructions for refraining from transmitting on the first RF spectrum band based on receiving the channel reservation signal. In some examples of the method, apparatus, and non-transitory computer-readable medium described above, the channel reservation signal includes a preamble indicating a duration and the base station refrains from transmitting for the indicated duration.

In some examples of the method, apparatus, and non-transitory computer-readable medium described above, the channel reservation transmission may be a PUCCH waveform. In some examples of the method, apparatus, and non-transitory computer-readable medium described above, the first RF spectrum band includes a RF spectrum band above 6 GHz and the second RF spectrum band includes a RF spectrum band below 6 GHz. In some examples of the method, apparatus, and non-transitory computer-readable medium described above, the first RF spectrum band includes an unlicensed or a shared access RF spectrum band and the second RF spectrum band includes an unlicensed or a shared access RF spectrum band or the licensed RF spectrum band. In some examples of the method, apparatus, and non-transitory computer-readable medium described above, the second RF spectrum band includes the licensed RF spectrum band, where the licensed RF spectrum band includes an FDD licensed or TDD licensed spectrum band.

In some examples of the method, apparatus, and non-transitory computer-readable medium described above, transmissions from the UE are transmitted in a spectrum band other than the first spectrum band based at least in part on lacking an uplink transmission capability in the first spectrum band.

DETAILED DESCRIPTION

Figure 1:
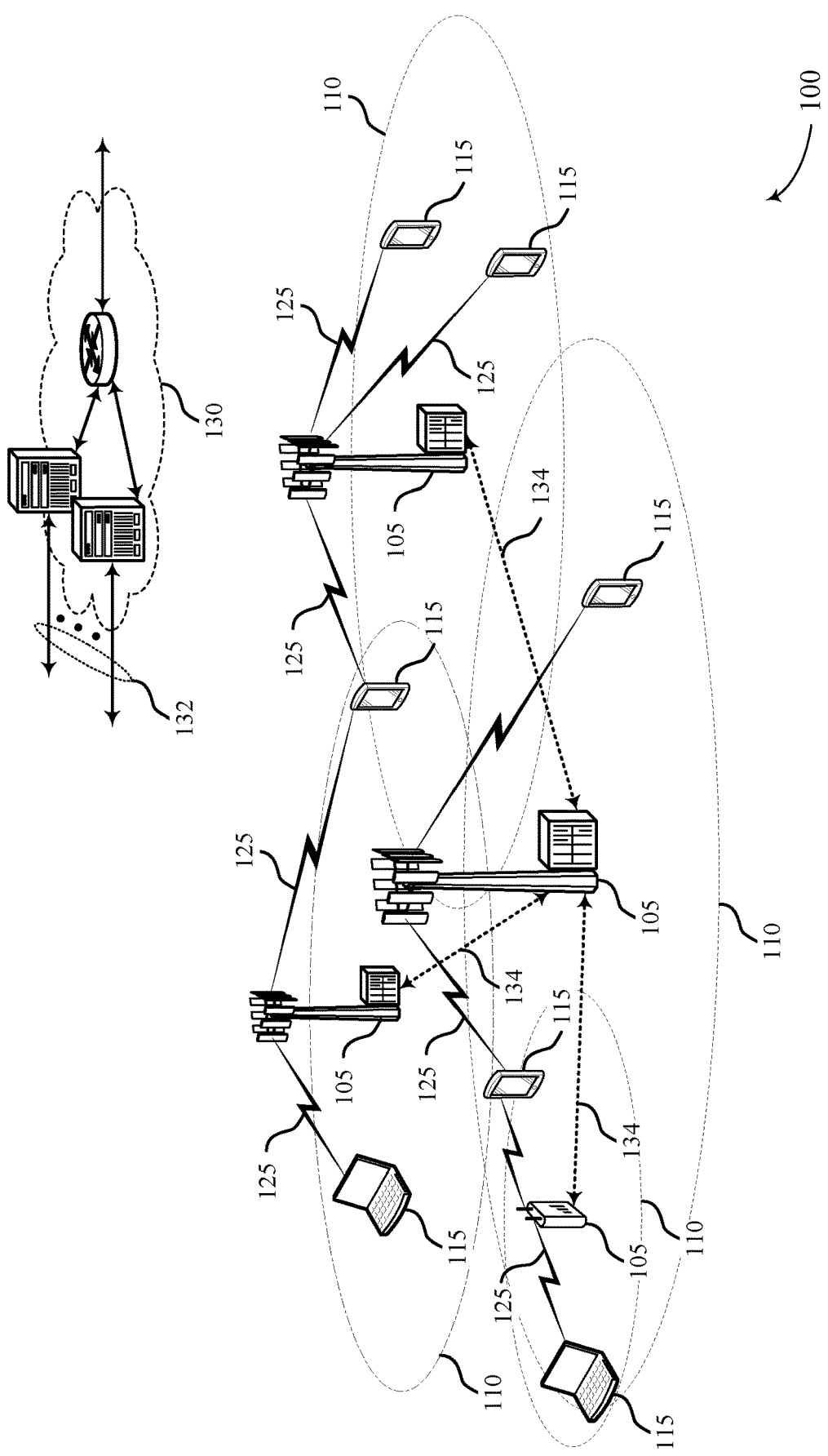
FIG. 1 illustrates an example of a wireless communications system that supports LBT and channel reservation for millimeter wave systems in accordance with aspects of the present disclosure.

A serving base station and a user equipment (UE) may perform transmissions on a first radio frequency (RF) spectrum band or a second RF spectrum band, or both. In addition, the first and second RF spectrum band may be shared access or unlicensed. In some cases, the first RF spectrum band may be a mmW band and the second RF spectrum band may be a sub-6 gigahertz (GHz) band. In the case that the serving base station and the UE are communicating on a downlink channel, neighboring devices (e.g., neighboring base stations and/or UEs) in geographic proximity to the UE, may also be communicating downlink transmissions in the downlink channel.

This coexistence of downlink transmission on a downlink channel may provide interference to the UE attempting to receive downlink transmission from the serving base station on the downlink channel. Further, in some cases the UE may be unable to transmit a message that reaches one or more neighboring devices, to indicate a downlink and/or uplink channel usage, due to limited transmission power and coverage area associated with mmW band systems. The described techniques may provide higher data rates, improve transmission capacity, spectral efficiency, and enhance coexistence, while reducing interference in a mmW system by supporting downlink transmission on a first RF spectrum band while providing channel reservation signal to neighboring devices on a second RF spectrum band.

A base station may transmit a pre-grant message to a UE. The pre-grant message may indicate that a downlink transmission is available for transmission to the UE on a first RF spectrum band. In this case, the first RF spectrum band may be a RF spectrum band above 6 GHz (e.g., a millimeter wave (mmW) band, such as a band in the range from 30 GHz to 300 GHz). The UE may receive the pre-grant message on the first RF spectrum band from the base station. Upon receiving the pre-grant message, the UE may perform a listen-before-talk (LBT) procedure. The UE may perform the LBT procedure in a second RF spectrum band. The second RF spectrum band may be a RF spectrum band below 6 GHz (e.g., a sub-6 GHz band). In some cases, the UE may receive the pre-grant message in the second RF spectrum band.

The UE may then, based on a successful result of the LBT procedure, transmit a channel reservation signal on the second RF spectrum band. For example, the UE may transmit the channel reservation signal to one or more neighboring devices to indicate that the UE will be receiving downlink transmissions or performing an uplink transmission. For example, the channel reservation signal may have a duration field that indicates a length of a transmission opportunity associated with the UE. As such, the UE may mitigate interference provided from the neighboring devices that are in geographic proximity to the UE. The one or more neighboring devices may receive the channel reservation message from the UE on the second RF spectrum band which may trigger the one or more neighboring devices to backoff for a duration of the transmission opportunity, as indicated in the channel reservation message.

Upon transmitting the channel reservation message, after a successful LBT procedure, the UE may transmit a response to the pre-grant message on the second RF spectrum band to the base station. The base station may receive the response message from the UE and transmit downlink transmissions to the UE using a set of transmit beams on the first RF spectrum band. For example, the base station may transmit data on a mmW band downlink channel. The UE may transmit, to the base station on the second RF spectrum band (e.g., a sub-6 GHz band uplink channel), one or more acknowledgement (ACK) or non-acknowledgment (NACK) messages, in response to receiving the downlink transmissions.

Aspects of the disclosure are initially described in the context of a wireless communications system. Exemplary UEs and base stations (e.g., evolved NodeBs (eNBs), next generation NodeBs (gNBs)), systems, and process flows that support LBT and channel reservation for mmW systems. Aspects of the disclosure are further illustrated by and described with reference to apparatus diagrams, system diagrams, and flowcharts that relate to LBT and channel reservation for mmW systems.

FIG. 1 illustrates an example of a system 100 for wireless communication that supports LBT and channel reservation for mmW systems in accordance with aspects of the present disclosure. The system 100 includes base stations 105, UEs 115, and a core network 130. In some examples, the system 100 may be a Long Term Evolution (LTE) network, an LTE-Advanced (LTE-A) network, or a New Radio (NR) network. In some cases, system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B, or giga-nodeB (either of which may be referred to as a gNB), a Home NodeB, a Home eNodeB, or some other suitable terminology. System 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

System 100 may also support cross band pairing where different RF spectrum bands or RATs, or both, are paired for uplink or downlink communications, or both. For example, system 100 may pair a mmW band in the downlink with a sub-6 GHz and/or mmW band in the uplink, or vice versa. Some UEs 115 may support communicating in both bands whereas other UEs 115 may only support communicating in one band. In some examples of system 100, the base stations 105 and the UE 115 may perform transmissions on a first RF spectrum band or a second RF spectrum band, or both. In addition, the first and second RF spectrum band may be licensed or unlicensed, or may be shared licensed, including licensed RF spectrum shared by different users or operators. In some cases, the first RF spectrum band may be a mmW band and the second RF spectrum band may be a sub-6 GHz band. In the case that the base station 105 and the UE 115 are communicating on a mmW band downlink or uplink channel, neighboring base stations and/or UEs in geographic proximity to the base station 105 and the UE 115 may also be operating on the mmW band downlink or uplink channel. These neighboring base stations 105 and/or UE 115 may provide interference to the UE 115. Further, in some cases the UE 115 may not be able to transmit a message that reaches the neighboring base stations 105 and/or UEs 115, to indicate a downlink and/or uplink channel usage, due to limited transmission power and coverage area associated with mmW band. As such, system 100 may provide techniques to provide higher data rates, improve transmission capacity, spectral efficiency, and enhance coexistence, while reducing interference in the system 100.

The base station 105 may transmit a pre-grant message to the UE 115 via communication link 125. The pre-grant message may indicate that a downlink transmission is available for transmission to the UE 115 on a first RF spectrum band. In this case, the first RF spectrum band may be a RF spectrum band above 6 GHz (e.g., a mmW band). The UE 115 may receive the pre-grant message on the first RF spectrum band from the base station 105. Upon receiving the pre-grant message, the UE 115 may perform an LBT procedure. In this case, the UE 115 may perform the LBT procedure in a second RF spectrum band. The second RF spectrum band may be a RF spectrum band below 6 GHz (e.g., a sub-6 GHz band).

The UE 115 may then, based on a successful result of the LBT procedure, transmit a channel reservation signal on the second RF spectrum band. For example, the UE 115 may transmit the channel reservation signal to one or more neighboring devices via sub-6 GHz band uplink channel, to indicate that the UE 115 will be receiving a downlink transmission or performing an uplink transmission. The channel reservation signal may have a duration field that indicates a length of a transmission opportunity associated with the UE 115 and the base station 105. As such, the UE 115 may mitigate interference provided from neighboring base stations 105 and/or UEs 115 operating also in the mmW band. The one or more neighboring base stations 105 and/or UEs 115 may receive the channel reservation message from the UE 115 on the second RF spectrum band and trigger the one or more neighboring base stations and/or UEs to backoff for a duration of the transmission opportunity.

Upon transmitting the channel reservation message after a successful LBT procedure, the UE 115 may transmit a response to the pre-grant message on the second RF spectrum band to the base station 105. For example, the UE 115 may transmit the pre-grant response message to the base station 105 on a sub-6 GHz band uplink channel. The base station 105 may receive the pre-grant response message from the UE 115, and transmit downlink transmissions to the UE 115 using one or more of a set of transmit beams on the first RF spectrum band (e.g., mmW band downlink channel). The UE 115 may transmit, to the base station 105 on the second RF spectrum band (e.g., sub-6 GHz band uplink channel), one or more ACK or NACK messages in response to receiving the downlink transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or another interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

System 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. System 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users. Portions of the centimeter band (SHF region) less than 6 GHz, e.g., including the ISM bands, may be included in the sub-6 GHz band. Portions of the decimeter band (UHF region) may also be included in the sub-6 GHz band.

System 100 may also operate in an extremely high frequency (EHF) region of the spectrum (e.g., from 30 GHz to 300 GHz), also known as the millimeter band (mmW band). In some examples, system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, system 100 may utilize both licensed and unlicensed RF spectrum bands. For example, system 100 may employ License Assisted Access (LAA), LTE-Unlicensed (LTE-U) radio access technology (RAT), or NR technology in an unlicensed band such as the 5 GHz ISM band. When operating in unlicensed RF spectrum bands, wireless devices such as base stations 105 and UEs 115 may employ LBT procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission.

Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at multiple antenna elements of an antenna array, or by processing received signals according to different receive beamforming weight sets applied to signals received at multiple antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the system 100, and may be referred to as a transmission time interval (TTI). In other cases, a smallest scheduling unit of the system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of RF spectrum resources having a defined physical layer structure for supporting communications over a communication link 125. For example, a carrier of a communication link 125 may include a portion of a RF spectrum band that is operated according to physical layer channels for a given radio access technology. Each physical layer channel may carry user data, control information, or other signaling. A carrier may be associated with a pre-defined frequency channel (e.g., an E-UTRA absolute RF channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

Devices of the system 100 (e.g., base stations 105 or UEs 115) may have a hardware configuration that supports communications over a particular carrier bandwidth or may be configurable to support communications over one of a set of carrier bandwidths. In some examples, the system 100 may include base stations 105 and/or UEs 115 that can support simultaneous communications via carriers associated with more than one different carrier bandwidth. System 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

Systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Figure 2:
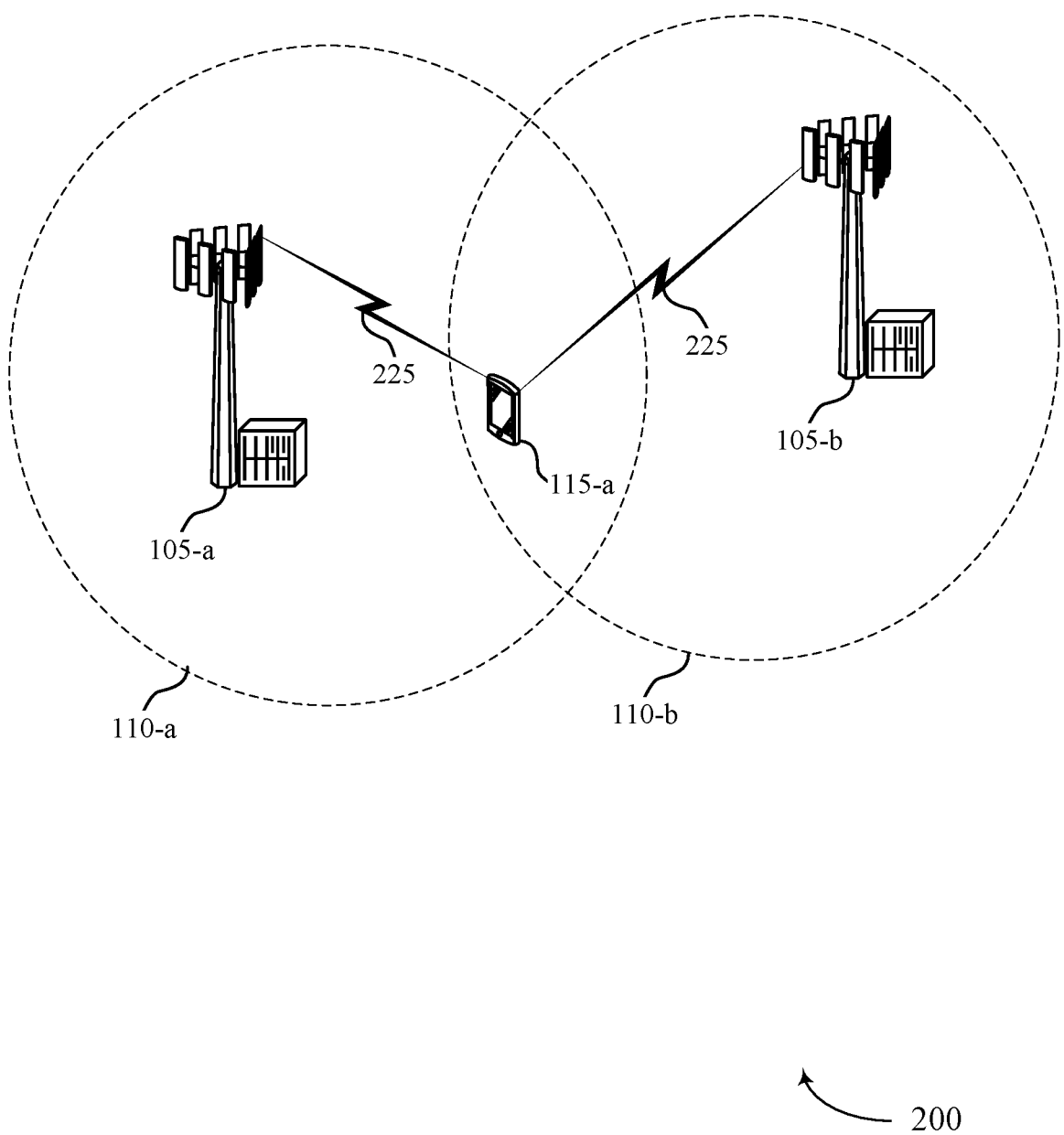
FIG. 2 illustrates an example of a system that supports LBT and channel reservation for millimeter wave systems in accordance with aspects of the present disclosure.

FIG. 2 illustrates an example of a system 200 that supports LBT and channel reservation for mmW systems in accordance with various aspects of the present disclosure. In some examples, system 200 may implement aspects of system 100. System 200 may include a base station 105-a, a base station 105-b, and a UE 115-a, which may be examples of the corresponding devices described with reference to FIG. 1 (e.g., base station 105 or UE 115). In the example of FIG. 2, system 200 may operate according to a RAT such as a 5G or NR RAT, although techniques described herein may be applied to any RAT and to systems that may concurrently use two or more different RATs. In some cases, system 200 may operate according to a 5G or NR RAT and support UE mobility using network slicing for UE 115-a. System 200 may support pairing uplink or downlink communications, or both. For example, base station 105-a, base station 105-b, and UE 115-a may pair a mmW band in the downlink with a sub-6 GHz and/or mmW band in the uplink. In some cases, UE 115-a may support communicating in both bands. Alternatively, in other cases, UE 115-a may only support communicating in one band.

UE 115-a may communicate with base station 105-a or base station 105-b, or both via bidirectional link 225. Base station 105-a may be associated with a geographic coverage area 110-a and base station 105-b may be associated with a geographic coverage area 110-b. Geographic coverage areas 110 may be divided into sectors making up a portion of geographic coverage area 110, and each sector may be associated with a cell. For example, base station 105-a or base station 105-b may provide communication coverage for a macro cell, a small cell, a hot spot, or other types of cells, or various combinations thereof. In some examples, geographic coverage area 110-a and geographic coverage area 110-b may overlap.

Base station 105-a and UE 115-a may perform transmissions on a first RF spectrum band or a second RF spectrum band, or both. In addition, the first and second RF spectrum band may be licensed or unlicensed, including shared licensed, or a combination thereof. In some cases, the first RF spectrum band may be a mmW band and the second RF spectrum band may be a sub-6 GHz band. In the case that base station 105-a and UE 115-a are communicating on a mmW band downlink channel, neighboring base station 105-b, which is in geographic proximity to UE 115-a, may also be communicating downlink transmissions in a mmW band downlink channel. This coexistence of downlink transmission on a mmW band downlink channel may provide interference to UE 115-a attempting to receive downlink transmission from base station 105-a on the mmW band downlink channel. Further, in some cases UE 115-a may be unable to transmit a message in the mmW band that reaches neighboring base station 105-b to indicate a downlink and/or uplink channel usage, due to limited transmission power and coverage area associated with the mmW band. As such, the techniques described herein may provide higher data rates, improve transmission capacity, spectral efficiency, and enhance coexistence, while reducing interference in a mmW system.

Base station 105-a may transmit a pre-grant message to UE 115-a. The pre-grant message may indicate that a downlink transmission is available for transmission to UE 115-a on the first RF spectrum band. UE 115-a may receive the pre-grant message on the first RF spectrum band from base station 105-a. Upon receiving the pre-grant message, UE 115-a may perform an LBT procedure. UE 115-a may perform the LBT procedure in a second RF spectrum band. UE 115-a may then, based on a successful result of the LBT procedure, transmit a channel reservation signal on the second RF spectrum band. For example, UE 115-a may transmit the channel reservation signal to neighboring base station 105-b to indicate that UE 115-a will be receiving downlink transmissions or performing an uplink transmission. For example, the channel reservation signal may have a duration field that indicates a length of a transmission opportunity associated with UE 115-a. As such, UE 115-a may mitigate interference provided from neighboring base station 105-b. Neighboring base station 105-b may receive the channel reservation message from UE 115-a on the second RF spectrum band which may trigger neighboring base station 105-b to backoff for a duration of the transmission opportunity.

Upon transmitting the channel reservation message, after a successful LBT procedure, UE 115-a may transmit a response to the pre-grant message on the second RF spectrum band to base station 105-a. Base station 105-a may receive the response message from UE 115-a and transmit downlink transmissions to UE 115-a using a set of transmit beams on the first RF spectrum band. For example, base station 105-a may transmit data on a mmW band downlink channel. UE 115-a may transmit, to base station 105-a on the second RF spectrum band (e.g., a sub-6 GHz band uplink channel), one or more ACK or NACK messages, in response to receiving the downlink transmissions.

As a result, UE 115-a may receive data from base station 105-a on a first RF spectrum band (e.g., mmW band downlink channel) and transmit messages (e.g., ACK, NACKs, pre-grant response, channel reservation signals, etc.) on a second RF spectrum band (e.g., sub-6 GHz band uplink channel). In addition, system 200 may provide techniques to improve transmission capacity, spectral efficiency, and enhance coexistence, while reducing interference from neighboring base stations 105.

Figure 3:
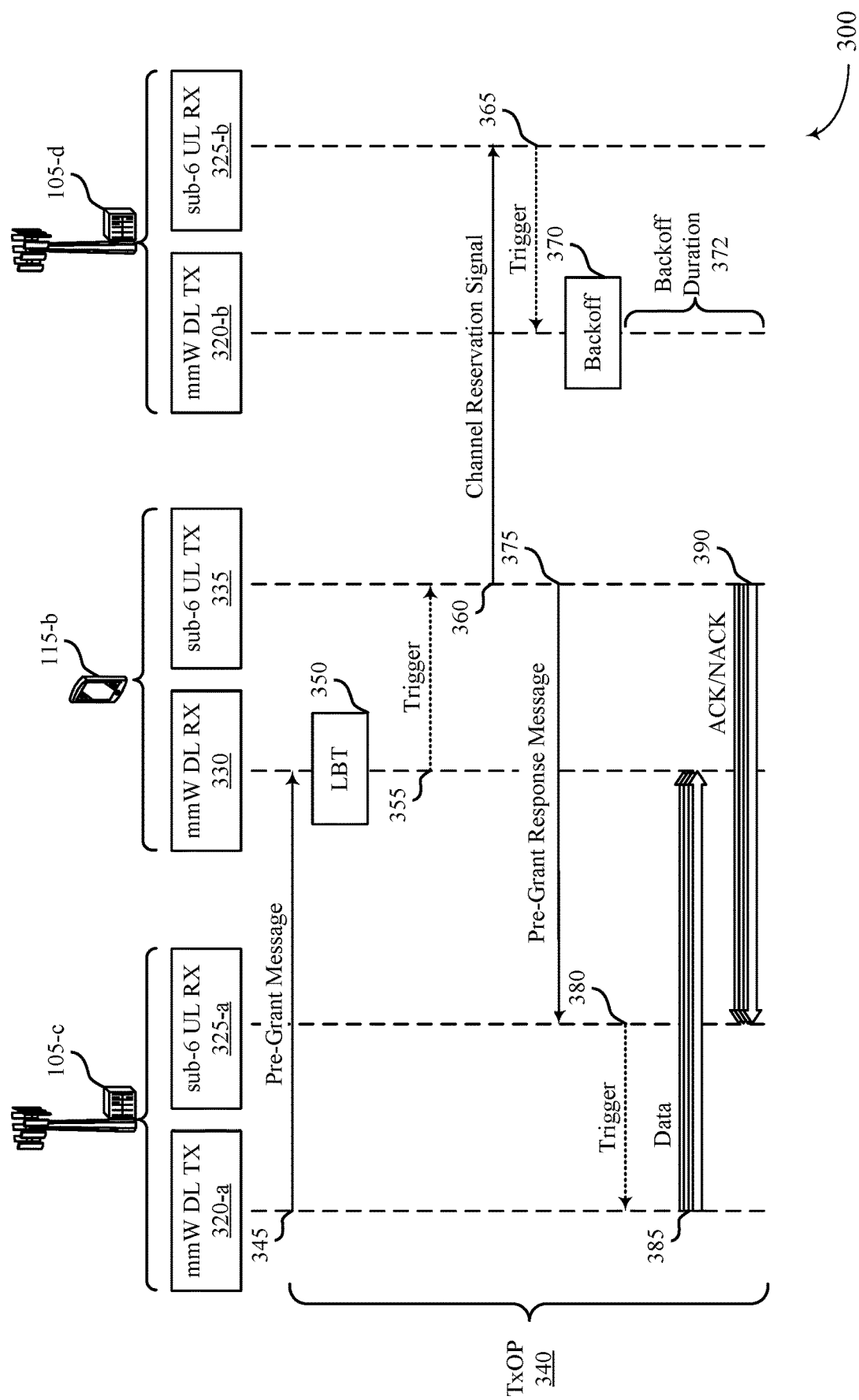
FIGS. 3 through 5 illustrate examples of a process flow that supports LBT and channel reservation for millimeter wave systems in accordance with aspects of the present disclosure.

FIG. 3 illustrates an example of a process flow 300 that supports LBT and channel reservation for mmW systems in accordance with various aspects of the present disclosure. In some examples, process flow 300 may implement aspects of system 100 and 200. UE 115-*b* may be an example of aspects of a respective one of the UEs described with reference to FIGS. 1 and 2. Base station 105-*c* and base station 105-*d* may be an example of aspects of a respective one of the base stations described with reference to FIGS. 1 and 2 (e.g., base station 105-*c* may be an example of aspects of base station 105-*a* and base station 105-*d* may be an example of aspects of base station 105-*b*). Process flow 300 may also support cross band pairing where different RF spectrum bands and RATs are paired for uplink or downlink communications, or both. For example, base station 105-*c*, base station 105-*d*, and UE 115-*b* may pair a mmW band in the downlink with a sub-6 GHz and/or mmW band in the uplink. In some cases, UE 115-*b* may support communicating in both bands. Alternatively, in other cases, UE 115-*b* may only support communicating in one band (e.g., UE 115-*b* may only transmit in a sub-6 GHz band and may be able to receive in one or both of sub-6 GHz bands and mmW bands). As such, process flow 300 may support receivers (or transmitter) that are configured in a RF spectrum band above sub-6 GHz band paired with transmitters (or receivers) that are configured in a RF spectrum band below sub-6 GHz band. For examples, process flow 300 may support mmW downlink paired with sub-6 GHz band uplink.

In the following description of process flow 300, the operations between base station 105-*c*, UE 115-*b*, and base station 105-*d* may be transmitted in a different order than the exemplary order shown, or the operations performed by base station 105-*c*, or UE 115-*b*, or base station 105-*d* may be performed in different orders or at different times. Certain operations may also be left out of process flow 300, or other operations may be added to process flow 300.

Process flow 300 may utilize both licensed and unlicensed RF spectrum bands. For example, process flow 300 may employ LAA, LTE-Unlicensed (LTE-U) radio access technology, or NR technology in an unlicensed band. When operating in unlicensed RF spectrum bands, base station 105-*c*, base station 105-*d*, and UE 115-*b* may employ LBT procedures to ensure a frequency channel is clear before transmitting information (e.g., packets, messages, data). In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or any combination thereof.

Base station 105-*c* may include one or more receivers and transmitters configured on a same or different RF spectrum band. In this case, base station 105-*c* may have a transmitter 320-*a* configured to operate on a mmW band (e.g., band above 6 GHz), and a receiver 325-*a* configured to operate on a sub-6 GHz band (e.g., band below 6 GHz). Receiver 325-*a* may receive information such as messages, packets, user data, or control information associated with various information channels (e.g., control channels, data channels, and information related to pre-grant response messages, etc.). Receiver 325-*a* may utilize a single antenna or a set of antennas. Additionally, transmitter 320-*a* may transmit downlink transmission to UE 115-*b*.

Base station 105-*d* may also include a receiver and transmitter configured on a same or different RF spectrum band. In this case, base station 105-*d* may have a transmitter 320-*b* configured to operate in a mmW band (e.g., band above 6 GHz), and a receiver 325-*b* configured to operate in a sub-6 GHz band (e.g., band below 6 GHz). Receiver 325-*b* may receive information such as messages, packets, user data, or control information associated with various information channels (e.g., control channels, data channels, and information related to channel reservation signals, etc.). Additionally, transmitter 320-*b* may transmit downlink transmission to UE 115-*b*.

UE 115-*b* may, additionally or alternatively, include a receiver and transmitter configured on a same or different RF spectrum band. UE 115-*b* may have a receiver 330 configured to operate in a mmW band (e.g., including bands above 6 GHz, and in particular one or more bands in the range of 30 GHz to 300 GHz), and a transmitter 335 configured to operate in a sub-6 GHz band (e.g., band below 6 GHz, and in particular in one or more bands in the range above 300 MHz and less than 6 GHz, which may include one or more bands in the portions of the centimeter band from 3 GHz to 6 GHz, the 900 MHz band, the 2.4 GHz band, etc.). Receiver 330 may receive data or control information associated with various information channels (e.g., control channels, data channels, and information related to pre-grant messages, etc.). Additionally, transmitter 335 may transmit uplink transmissions (e.g., a pre-grant response message, a channel reservation message) to base station 105-*c*, base station 105-*d*, or both.

Process flow 300 may also include a transmission opportunity (TxOP) 340. TxOP 340 may be a duration in which base station 105-*c* and UE 115-*b* are allowed to perform downlink and uplink transmission between each other. TxOP 340 may have a start time and a maximum duration (e.g., end time). In some cases, TxOP 340 may be configured by base station 105-*c*. At 345, base station 105-*c* may transmit a pre-grant message to UE 115-*b* using transmitter 320-*a* on a mmW band (e.g., band above 6 GHz) downlink channel. The pre-grant message may be a packet including one or more fields, and at least one field in the packet may indicate TxOP 340 to UE 115-*b*.

In some cases, base station 105-*c* may transmit the pre-grant message to UE 115-*b* on one or more downlink transmit beams (e.g., mmW band transmission beams) using transmitter 320-*a*. The mmW band downlink transmission beams may be transmitted by base station 105-*c* in a beamformed manner and may sweep through an angular coverage region or sector. In some examples, base station 105-*c* may transmit the pre-grant message on the mmW band downlink transmission beams having variable beam widths or at different elevation angles, or both. The mmW band downlink transmission beams may also be associated with a beam index. The beam index may be an indicator to UE 115-*b* identifying that the mmW band downlink transmission beams originate from base station 105-*c*. Base station 105-*c* may also transmit the mmW band downlink transmission beams during different symbols periods of a subframe. For example, base station 105-*c* may transmit a pre-grant message on a mmW band downlink transmission beam during a third symbol period (e.g., symbol 2) of a subframe.

UE 115-*b* may receive the pre-grant message from base station 105-*c* on a mmW band downlink channel using receiver 330. Since the downlink transmissions between base station 105-c and UE 115-b are in the mmW band, UE 115-b may have to protect receiver 330 from interference provided by a neighboring base station 105 (e.g., base station 105-d) or UE 115. For base station 105-c, however, no protection of receiver 325-a may be necessary due to an absence of mmW band uplink traffic on receiver 325-a. To protect receiver 330 of UE 115-b, UE 115-b may perform an LBT procedure on one or more mmW band downlink channels to determine any presence of interference provided from neighboring base stations 105 or UEs 115.

At 350, UE 115-b may perform an LBT procedure on the mmW band downlink channel. The LBT procedure may be performed via receiver 330. In addition, the LBT procedure may be a category 4 LBT, or a one-shot LBT, or a combination thereof. In some cases, UE 115-b may determine a range associated with a downlink beam sweep procedure based on a range associated with a beam sweep. In some examples, the range may include multiple thresholds, for example, different levels of inner thresholds that determine a level of interference. UE 115-b may also identify presence of one or more neighboring base stations 105 or UEs 115 based on the LBT procedure.

UE 115-b may detect interference based on the LBT procedure and determine whether the detected interference satisfies a threshold value (e.g., signal-to-interference-plus-noise ratio (SINR) value). In this case, UE 115-b may detect some interference from base station 105-d. If UE 115-b determines that the interference satisfies the threshold value, UE 115-b may disregard the pre-grant message received from base station 105-c. Alternatively, UE 115-b may however determine that the interference is below the threshold value and may perform one or more channel reservation procedures. UE 115-b may also perform an LBT procedure on one or more sub-6 GHz band uplink channels via transmitter 335, before transmitting any channel reservation information to base station 105-d.

At 355, receiver 330 may trigger transmitter 335 to perform one or more channel reservation procedures including transmitting a channel reservation signal. In some cases, UE 115-b may be incapable of transmitting a channel reservation signal in a mmW band uplink channel (e.g., UE 115-b may have no mmW band uplink transmission capability). In some cases, base station 105-c and/or 105-d may be incapable of receiving a channel reservation signal in a mmW band uplink channel (e.g., the base stations may have no mmW band uplink reception capability). At 360, UE 115-b may transmit a channel reservation signal to base station 105-d on one or more sub-6 GHz band uplink channels using transmitter 335. In some cases, UE 115-b may transmit the channel reservation signal based on a successful result of the LBT procedures performed on receiver 330 or on transmitter 335, or both. The channel reservation signal may indicate TxOP 340 duration. For example, the channel reservation signal may be a packet and TxOP 340 duration indication may be embedded in a field of a preamble of the packet. TxOP 340 duration indication may be indicated using one or more bits in the field of the preamble. In some examples, the channel reservation signal may indicate one or more mmW band downlink transmission beams providing interference to UE 115-b. For example, UE 115-b may identify that mmW band downlink transmission beams one through three of base station 105-d are providing interference (e.g., based on satisfying a threshold value (e.g., SINR)) and are directed towards UE 115-b. In some cases, the channel reservation signal may include coexistence information, such as a power spectral density (PSD) limit for base station 105-d mmW band downlink channel, transmission.

In some cases, UE 115-b may perform frequency division duplexing on an uplink carrier carrying the channel reservation signal or perform time division duplexing on the uplink carrier. In some examples, the channel reservation signal transmission may be on a physical uplink control channel (PUCCH) waveform. The PUCCH waveform may be a dedicated waveform. In some cases, UE 115-b may utilize on-demand LBT procedure and may also be aware of timing information of base station 105-d. In some cases, UE 115-b may reuse the PUCCH (e.g., long or short) for transmission of the channel reservation signal with more than two bits, as a payload size may include more than two bits. In some cases, if the uplink carrier carrying the channel reservation signal is frequency division duplexed, then the uplink channel reservation signal transmission may not be subject to an LBT procedure and UE 115-b may transmit it in any slot. Alternatively, if the uplink carrier carrying the channel reservation signal is time division duplexed, then the uplink channel reservation signal transmission may also not need to subjected to an LBT procedure. UE 115-b may transmit the uplink channel reservation signal transmission when base station 105-d is listening (e.g., performing LBT).

In some examples, base station 105-c or base station 105-d may provide frequent channel reservation opportunities for other non-serving UEs 115. For example, if base station 105-d is using self-contained slot structure (e.g., either downlink centric or uplink centric), a shortened PUCCH (sPUCCH) based channel reservation signal transmission may be transmitted during an uplink common control segment. Additionally or alternatively, base station 105-c, base station 105-d, and/or other base stations 105 may configure frequency uplink slots. The uplink transmission opportunities may be indicated at UE 115-b (e.g., the UE 115 transmitting the channel reservation signal). In some examples, process flow 300 may assume synchronization across different network operators, or at least base station 105-c or base station 105-d timing may be known through monitoring or configuration to UE 115-b.

In some cases, where an uplink channel (e.g., sub-6 GHz band uplink channel) is unlicensed, UE 115-b may perform an LBT procedure before a channel reservation signal and a pre-grant response transmission. In some cases, an LBT procedure failure at sub-6 GHz band uplink channel may block the mmW band downlink channel as well, even if that channel passes its own LBT procedure. As such, base station 105-c and UE 115-b may schedule more channel reservation signal transmissions or pre-grant response opportunities, or both, within TxOP 340 to allow UE 115-b additional opportunities to accept the pre-grant, in case the LBT procedure at sub-6 GHz band uplink channel passes at a later instance.

At 365, receiver 325-b of base station 105-d may trigger transmitter 320-b to backoff for a duration of TxOP 340. At 370, base station 105-d may refrain from performing any mmW band downlink channel transmission via transmitter 320-b. Alternatively, base station 105-d may refrain from performing mmW band downlink channel transmissions only on the identified mmW downlink transmission beams indicated in the channel reservation signal by UE 115-b. This way, base station 105-d (i.e., interfering base station) may backoff to protect the reception of mmW band downlink transmission beams, at UE 115-b, from base station 105-c. The backoff may be associated with a backoff duration 372. In some examples, backoff duration 372 may be same or different in length compared to TxOP 340.

At 375, UE 115-b may transmit a pre-grant response message to base station 105-c via transmitter 335. Base station 105-c may receive pre-grant message via receiver 325-a. At 380, receiver 325-a may trigger transmitter 320-a to perform downlink transmissions to UE 115-b. At 385, base station 105-c may transmit data on one or more downlink transmissions to UE 115-b using transmitter 320-a. The data may be transmitted on one or more mmW downlink transmission beams using transmitter 320-a. The one or more mmW downlink transmit beams may be transmitted by base station 105-c in a beamformed manner. UE 115-b may receive the data on one or more mmW band downlink reception beams via receiver 330. In some cases, the mmW band downlink transmit beams of base station 105-c and the mmW downlink reception beams of UE 115-b may have a full or partial beam reciprocity or correspondence. For example, a first mmW band downlink transmit beam of base station 105-c may be paired with a mmW band downlink reception beam of UE 115-b.

At 390, UE 115-b may transmit one or more ACK or NACK messages in response to receiving the downlink transmissions via transmitter 335. As such, UE 115-b may receive data from base station 105-c on a first RF spectrum band (e.g., mmW band downlink channel) and transmit messages (e.g., ACK, NACKs, pre-grant response, channel reservation signals, etc.) on a second RF spectrum band (e.g., sub-6 GHz band uplink channel). For example, UE 115-b may transmit the ACK or NACK messages on a PUCCH.

Figure 4:
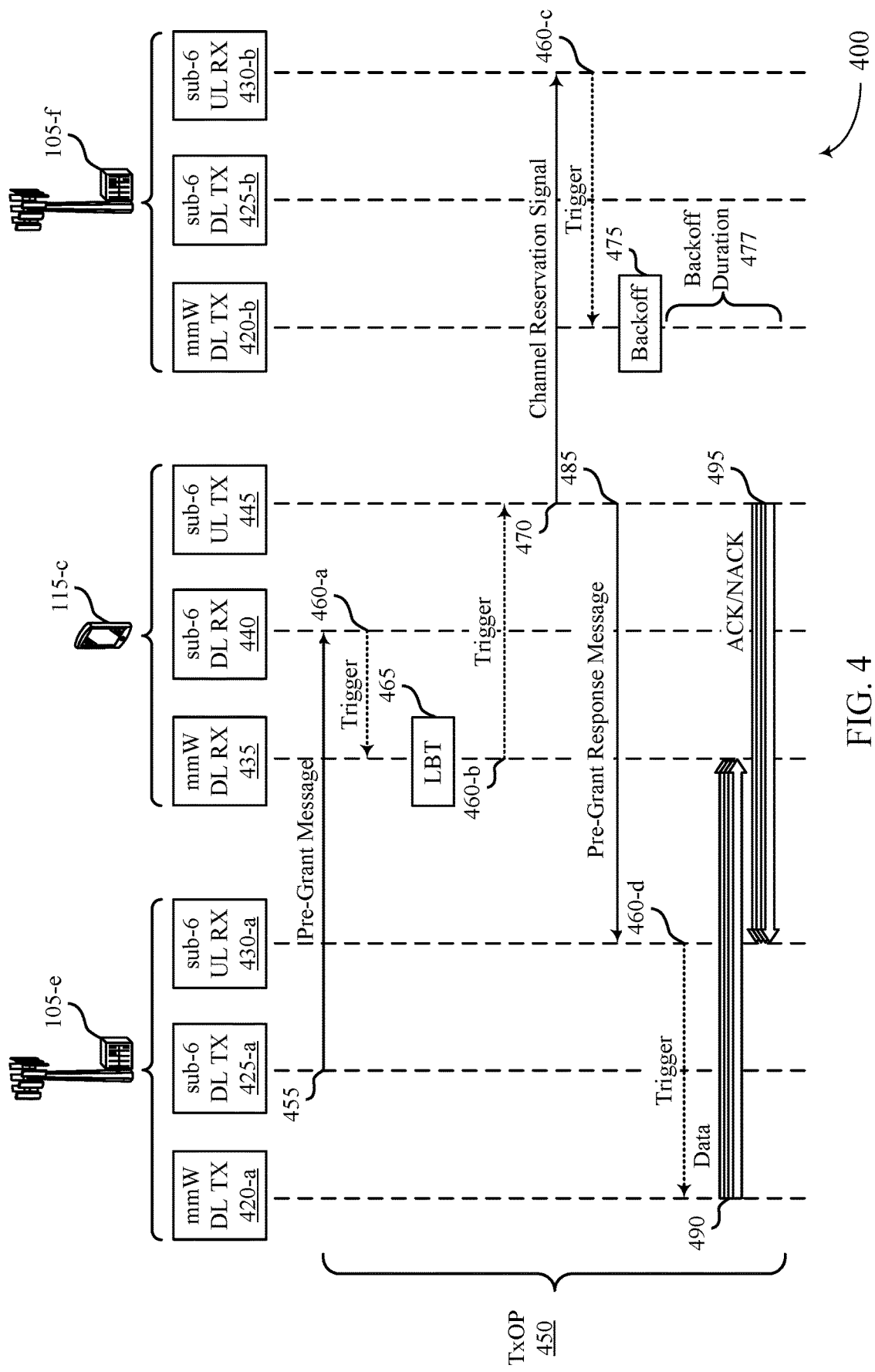

FIG. 4 illustrates an example of a process flow 400 that supports LBT and channel reservation for mmW systems in accordance with various aspects of the present disclosure. In some examples, process flow 400 may implement aspects of system 100 through 300. UE 115-c may be an example of aspects of a respective one of the UEs described with reference to FIGS. 1 through 3. Base station 105-e and base station 105-f may be an example of aspects of a respective one of the base stations described with reference to FIGS. 1 through 3. Process flow 400 may also support cross band pairing where different RF spectrum bands and RATs are paired for uplink or downlink communications, or both. For example, base station 105-e, base station 105-f, and UE 115-c may pair a mmW band in the downlink with a sub-6 GHz and/or mmW band in the uplink. In some cases, UE 115-c may support communicating in both bands. Alternatively, in other cases, UE 115-c may only support communicating in one band. As such, process flow 400 may support receivers (or transmitter) that are configured in a RF spectrum band above sub-6 GHz band paired with transmitters (or receivers) that are configured in a RF spectrum band below sub-6 GHz band paired. For examples, process flow 400 may support mmW downlink LAA paired with sub-6 band uplink and downlink.

In the following description of process flow 400, the operations between base station 105-e, UE 115-c, and base station 105-f may be transmitted in a different order than the exemplary order shown, or the operations performed by base station 105-e, or UE 115-c, or base station 105-f may be performed in different orders or at different times. Certain operations may also be left out of process flow 400, or other operations may be added to process flow 400. Process flow 400 may utilize both licensed and unlicensed RF spectrum bands. For example, process flow 400 may employ LAA, LTE-U radio access technology, or NR technology in an unlicensed band. When operating in unlicensed RF spectrum bands, base station 105-e, base station 105-f, and UE 115-c may employ LBT procedures to ensure a frequency channel is clear before transmitting data or control information. Operations in unlicensed spectrum may include downlink transmissions, uplink transmissions, peer-to-peer transmissions, or any combination thereof.

Base station 105-e may have one or more receivers and transmitters configured on a same or different RF spectrum band. Base station 105-e may have a transmitter 420-a configured to operate in a mmW band, a transmitter 425-a configured to operate in a sub-6 GHz band, and a receiver 430-a configured to also operate in the sub-6 GHz band. Receiver 430-a may receive information such as messages, packets, or control information associated with various information channels (e.g., control channels, data channels, and information related to pre-grant response messages, etc.). Transmitter 420-a or transmitter 425-a, or both may transmit downlink transmission to UE 115-c.

Base station 105-f may also have a receiver and transmitter configured on a same or different RF spectrum band. Base station 105-f may have a transmitter 420-b configured to operate in the mmW band, a transmitter 425-b configured to operate in the sub-6 GHz band, and a receiver 430-b configured also as a sub-6 band uplink receiver. Receiver 430-b may receive information such as messages or control information associated with various information channels (e.g., control channels, data channels, and information related to pre-grant response messages, etc.).

UE 115-c may, additionally or alternatively, have a receiver and transmitter configured on a same or different RF spectrum band. UE 115-c may have a receiver 435 configured to operate in the mmW band, a receiver 440 configured to operate in the sub-6 GHz band, and a transmitter 445 configured to also operate in the sub-6 GHz. Receiver 435 and receiver 440 may receive information such as messages, packets, or control information associated with various information channels. Transmitter 445 may transmit uplink transmissions (e.g., pre-grant response messages, channel reservation messages, schedule information) to base station 105-e or base station 105-f, or both.

Process flow 400 may also have a TxOP 450. TxOP 450 may be a length in which base station 105-e and UE 115-c are permitted to perform downlink and uplink transmissions. TxOP may have a start time and an end time. In some cases, TxOP 450 may be configured by base station 105-e. At 455, base station 105-e may transmit a pre-grant message to UE 115-c on one or more sub-6 GHz band downlink channels using transmitter 425-a. The pre-grant message may be a packet including one or more fields, and at least one field in the packet may indicate TxOP 450. In some examples, the pre-grant message may include downlink scheduling assignment (e.g., physical downlink shared channel (PDSCH) resource indication, HARQ information, control information related spatial multiplexing and command for power control of PUCCH uplink physical channel, etc.) or uplink grant scheduling (e.g., physical uplink shared channel (PUSCH) resource indication, HARQ information, channel status, command for power control of PUSCH uplink physical channel, etc.), or both. In some examples, the pre-grant message may be part of a downlink control information (DCI) message. In some cases, base station 105-e may transmit the pre-grant message to UE 115-c using one or more downlink carriers. A carrier may include a portion of a RF spectrum band (e.g., sub-6 GHz band) that is operated according to physical layer channels (e.g., physical downlink control channel (PDCCH)). In some cases, the one or more downlink carriers may be associated with a pre-defined frequency channel. Carriers may be downlink or uplink (e.g., in an FDD mode), or be configured to carry downlink and uplink communications (e.g., in a TDD mode).

UE 115-c may receive the pre-grant message from base station 105-e on one or more sub-6 GHz band downlink channels using receiver 440. UE 115-c may identify that base station 105-e may have available data for downlink transmission to UE 115-c. Because the downlink transmission between base station 105-e and UE 115-c will be in the mmW band, UE 115-c may have to protect receiver 435 from interference provided by neighboring base stations 105 and/or UEs 115. To guard receiver 435 from interference, UE 115-c may perform an LBT procedure on one or more mmW band downlink channels via receiver 435, to determine presence of any interference provided from neighboring base stations 105 and/or UEs 115.

At 460-a, receiver 440 may trigger receiver 435 of UE 115-c to perform an LBT procedure. At 465, UE 115-c may perform an LBT procedure on one or more mmW band downlink channels via receiver 435. In some cases, UE 115-c may determine a range associated with a downlink beam sweep procedure and perform the LBT in the range (e.g., a number of mmW band downlink channels). UE 115-c may detect interference based on the LBT procedure and determine whether the detected interference meets a threshold value (e.g., SINR value). UE 115-c may detect some interference from base station 105-f. If UE 115-c determines that the interference satisfies the threshold value, UE 115-c may disregard the pre-grant message received from base station 105-e. Alternatively, UE 115-c may determine that the interference is below the threshold value and may perform a channel reservation procedure. UE 115-c may also perform an LBT procedure one or more sub-6 GHz band uplink channels via transmitter 445. For example, UE 115-c may sense one or more RF spectrum bands of uplink channels before transmitting a channel reservation signal.

At 460-b, receiver 435 may trigger transmitter 445 to perform one or more channel reservation procedures including transmitting a channel reservation signal. In some cases, UE 115-c may be unable to transmit a channel reservation signal in a mmW band uplink channel. At 470, UE 115-c may transmit a channel reservation signal to base station 105-f one or more sub-6 GHz band uplink channels using transmitter 445. In some cases, UE 115-c may transmit the channel reservation signal based on a successful result of the LBT procedures performed on receiver 435 or transmitter 445, or both. The channel reservation signal may indicate TxOP 450 duration. For example, the channel reservation signal may be a packet and an indication including a duration of TxOP 450 may be inserted in a field of a preamble of the packet. In some cases, UE 115-c may perform frequency division duplexing on an uplink carrier carrying the channel reservation signal or perform time division duplexing on the uplink carrier. In some examples, the channel reservation transmission may be a physical PUCCH waveform.

At 460-c, receiver 430-b of base station 105-f may receive the channel reservation message and trigger transmitter 420-b to backoff for a duration of TxOP 450, based on the indication provided in the channel reservation message. At 475, base station 105-f may refrain from performing any downlink transmissions via transmitter 420-b. In some cases, base station 105-f may reduce its transmission power on transmitter 420-b such that the interference is below a threshold value. This way, base station 105-f (e.g., the interfering base station) may backoff to protect the reception of mmW band downlink transmit beams, at UE 115-c, from base station 105-e. The backoff may be associated with a backoff duration 477. In some examples, backoff duration 477 may be same or different in duration compared to TxOP 450. For example, in some cases, backoff duration 477 may have a length corresponding to a remainder of the duration of TxOP 450.

At 485, UE 115-c may transmit a pre-grant response message to base station 105-e one on or more sub-6 GHz band uplink channels, via transmitter 445. Base station 105-e may receive the pre-grant message via receiver 430-a. At 460-d, receiver 430-a may trigger transmitter 420-a to perform downlink transmissions to UE 115-c. At 490, base station 105-e may transmit data on one or more mmW band downlink channels to UE 115-c via transmitter 420-a. The data may be transmitted on one or more mmW band downlink transmit beams. The one or more mmW band downlink transmit beams may be transmitted by base station 105-e in a beamformed manner and sweep through an angular coverage region or sector.

UE 115-c may receive the data on a mmW downlink channel on a reception beams via receiver 435. In some cases, the mmW band transmit beams of base station 105-e and the mmW band reception beams of UE 115-c may have a full or partial beam reciprocity or correspondence. At 495, UE 115-c may transmit one or more ACK or NACK messages in response to receiving the data via transmitter 445. UE 115-c may transmit the ACK or NACK messages on a PUCCH. UE 115-c may also provide HARQ feedback to base station 105-e. As a result, UE 115-c may receive data from base station 105-e on a first RF spectrum band (e.g., mmW band downlink channel) and transmit messages (e.g., ACK, NACKs, pre-grant response, channel reservation signals, etc.) on a second RF spectrum band (e.g., sub-6 GHz band uplink channel). In addition, process flow 400 may provide techniques to improve transmission capacity, spectral efficiency, and enhance coexistence, while reducing interference from neighboring base stations 105 and/or UEs 115.

Figure 5:
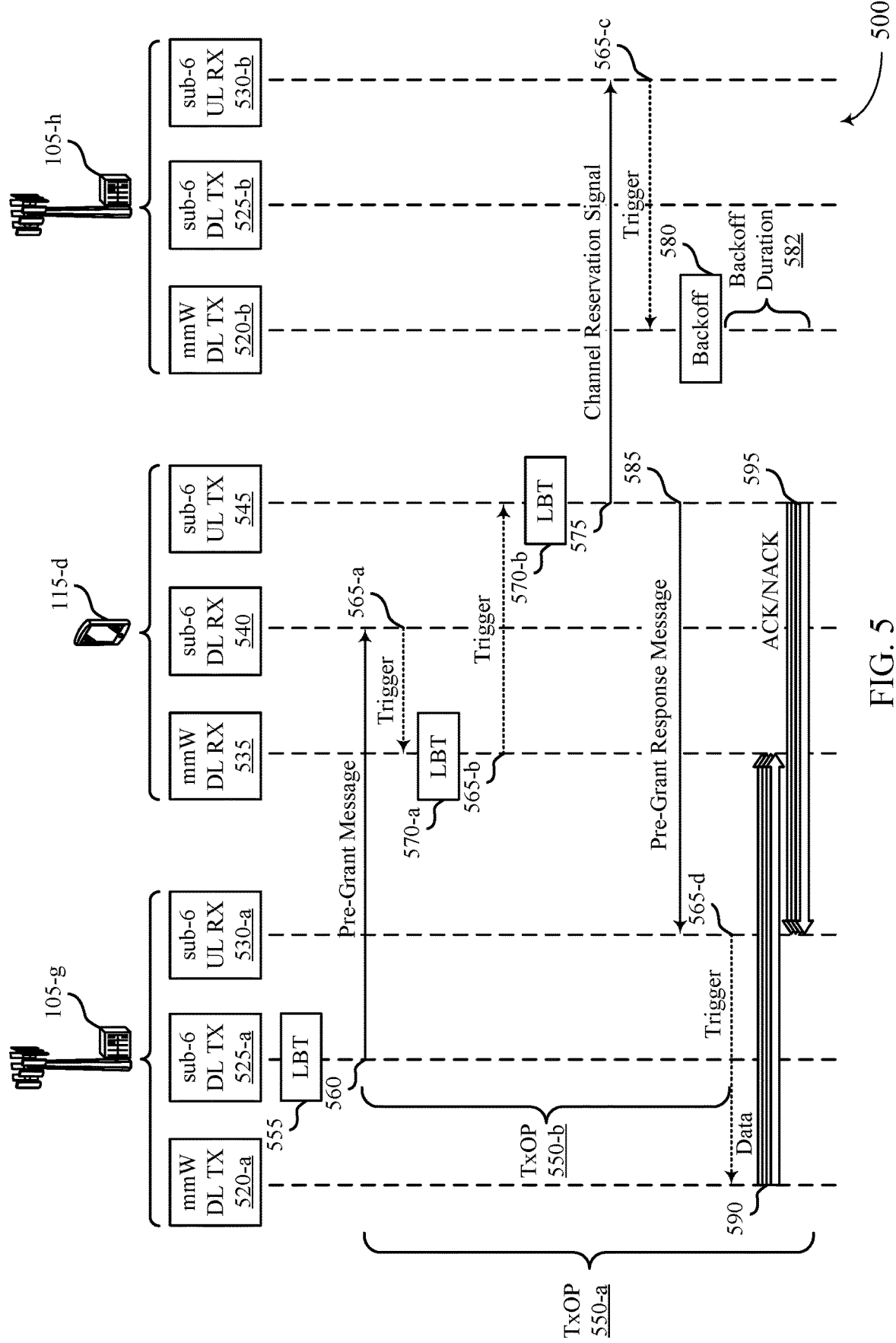

FIG. 5 illustrates an example of a process flow 500 that supports LBT and channel reservation for mmW systems in accordance with various aspects of the present disclosure. In some examples, process flow 500 may implement aspects of system 100 through 400. UE 115-d may be an example of aspects of a respective one of the UEs described with reference to FIGS. 1 through 4. Base station 105-g and base station 105-h may be an example of aspects of a respective one of the base stations described with reference to FIGS. 1 through 4.

Process flow 500 may also support cross band pairing where different RF spectrum bands and RATs are paired for uplink or downlink communications, or both. For example, base station 105-g, base station 105-h, and UE 115-d may pair a mmW band in the downlink with a sub-6 GHz and/or mmW band in the uplink. In some cases, UE 115-d may support communicating in both bands. Alternatively, in other cases, UE 115-d may only support communicating in one band. As such, process flow 500 may support receivers (or transmitter) that are configured in a RF spectrum band above sub-6 GHz band paired with transmitters (or receivers) that are configured in a RF spectrum band below sub-6 GHz band paired. For examples, process flow 500 may support mmW band downlink (e.g., LAA) paired with unlicensed sub-6 GHz band uplink and downlink.

In the following description of process flow 500, the operations between base station 105-g, UE 115-d, and base station 105-h may be transmitted in a different order than the exemplary order shown, or the operations performed by base station 105-g, or UE 115-d, or base station 105-h may be performed in different orders or at different times. Certain operations may also be left out of process flow 500, or other operations may be added to process flow 500. Process flow 500 may utilize both licensed and unlicensed RF spectrum bands. For example, process flow 500 may employ LAA, LTE-U radio access technology, or NR technology in an unlicensed band. When operating in unlicensed RF spectrum bands, base station 105-g, base station 105-h, and UE 115-d may perform LBT procedures to determine that a frequency channel is clear before transmitting data on the channel. Operations in unlicensed spectrum may include downlink transmissions, uplink transmissions, or both.

Base station 105-g may have one or more receivers and transmitters configured on a same or different RF spectrum band. Base station 105-g may have a transmitter 520-a configured to operate in a mmW band, a transmitter 525-a configured to operate in a sub-6 GHz band, and a receiver 530-a configured to operate in also in the sub-6 GHz band. Receiver 530-a may receive information such as messages, packets, or control information associated with various information channels (e.g., control channels, data channels, and information related to pre-grant response messages, etc.). Transmitter 520-a, transmitter 525-a, or both may transmit downlink transmission to UE 115-d. Base station 105-h may also have a receiver and transmitter configured on a same or different RF spectrum band. Base station 105-h may have a transmitter 520-b configured to operate in the mmW band, a transmitter 525-b configured to operate in the sub-6 GHz band, and a receiver 530-b configured to operate in also in the sub-6 GHz band. Receiver 530-b may also receive information such as messages, packets, or control information associated with various information channels (e.g., control channels, data channels, and information related to pre-grant response messages, etc.).

UE 115-d may, additionally or alternatively, have a receiver and transmitter configured on a same or different RF spectrum band. UE 115-d may have a receiver 535 configured to operate in a mmW band, a receiver 540 configured to operate in a sub-6 GHz band, and a transmitter 545 configured as to operate in also in the sub-6 GHz band. Receiver 535 and receiver 540 may receive information such as messages, packets, or control information associated with various information channels (e.g., control channels, data channels, and information related to pre-grant messages, etc.). Additionally, transmitter 545 may transmit uplink transmissions (e.g., pre-grant response messages, channel reservation messages) to base station 105-g or base station 105-h, or both.

Process flow 500 may have a TxOP 550 (e.g., TxOP 550-a and/or TxOP 550-b). Base station 105-g in some cases, may determine TxOP 550 (e.g., TxOP 550-a and/or TxOP 550-b) based on one or more system parameters (e.g., system bandwidth, uplink/downlink schedule information). For example, base station 105-g may determine TxOP 550 (e.g., TxOP 550-a and/or TxOP 550-b) based on a network load, a latency tolerance, a traffic profile, a scheduling condition, or any combination thereof. TxOP 550 (e.g., TxOP 550-a and/or TxOP 550-b) may be a duration in which base station 105-g and UE 115-d perform downlink and uplink transmission. At 555, base station 105-g may perform an LBT procedure. Base station 105-g may perform the LBT procedure one or more shared downlink channels within an unlicensed spectrum, via transmitter 525-a. In some cases, after determining that a shared downlink channel within the unlicensed spectrum is clear based on a result of the LBT procedure, base station 105-g may broadcast or transmit a pre-grant message to UE 115-d. In some cases, TxOP 550-b may extend from the time when base station 105-g transmits a pre-grant message (such as at 560) to a time when a trigger (such as at 565-d) is received from UE 115-d at base station 105-g. In some cases, TxOP 550-a may extend from when base station 105-g transmits a pre-grant message (such as the trigger at 560) to when base station 105-g receives some or all ACKs corresponding to data sent by base station 105-g (such as the ACKs transmitted at 595).

At 560, base station 105-g may transmit a pre-grant message to UE 115-d one or more sub-6 GHz band uplink channels using transmitter 525-a. The pre-grant message may indicate a duration of TxOP 550 (e.g., TxOP 550-a and/or TxOP 550-b). In some cases, base station 105-g may transmit the pre-grant message to UE 115-d using one or more downlink carriers. The one or more downlink carriers may include a portion of a RF spectrum band (e.g., a sub-6 GHz band) that is operated according to physical layer channels (e.g., PDCCH).

UE 115-d may receive the pre-grant message, on one or more sub-6 GHz band downlink channels, from base station 105-g using receiver 540. UE 115-d may identify that base station 105-g may have available data for downlink transmission to UE 115-d. At 565-a, receiver 540 may trigger receiver 535 of UE 115-d to perform an LBT procedure. At 570-a, UE 115-d may perform an LBT procedure on one or more mmW band downlink channels, e.g., using receiver 535. UE 115-d may identify a presence of neighboring base stations 105 and/or UEs 115 based on the LBT procedure. UE 115-d may detect interference based on the LBT procedure and determine whether the detected interference satisfies a threshold value (e.g., SINR value). UE 115-d may detect interference from base station 105-h. If UE 115-d determines that the interference satisfies the threshold value, UE 115-d may ignore the pre-grant message received from base station 105-g. Alternatively, if UE 115-d determines that the interference is below the threshold value, UE 115-d may perform one or more additional operations (e.g., channel reservation signaling, or additional LBT procedure on one or more additional transmitters and/or receivers).

At 565-b, receiver 535 of UE 115-d may trigger transmitter 545 of UE 115-d to perform an LBT procedure. As such, at 570-b, UE 115-d may perform an LBT procedure on one or more sub-6 GHz band uplink channels using transmitter 545. For example, UE 115-d may sense one or more RF spectrum bands of uplink channels before a transmission or reception of information (e.g., channel reservation signaling, a pre-grant response message).

At 575, UE 115-d may transmit a channel reservation signal one or more sub-6 GHz band uplink channels to base station 105-h using transmitter 545. In some cases, UE 115-d may transmit the channel reservation signal based on a successful result of the LBT procedures performed on receiver 535 or on transmitter 545, or both. The channel reservation signal may indicate a TxOP 550 duration (e.g., TxOP 550-a and/or TxOP 550-b). For example, the channel reservation signal may be a packet and an indication (e.g., one or more bits) including a duration of TxOP 550 (e.g., TxOP 550-a and/or TxOP 550-b) may be inserted in a field of a preamble of the packet.

At 565-c, receiver 530-b of base station 105-h may receive the channel reservation message and trigger transmitter 520-b to backoff for a duration of TxOP 550 (e.g., TxOP 550-a and/or TxOP 550-b). At 580, base station 105-h may refrain from performing any mmW or sub-6 GHz band, or both downlink transmission via transmitter 520-b. In some cases, base station 105-h may reduce its transmission power on transmitter 520-b such that the interference is below a threshold value. This way, base station 105-*h* may backoff to protect the reception of mmW band transmit beams at UE 115-*d*, from base station 105-*g*. The backoff may be associated with a backoff duration 582. In some examples, backoff duration 582 may be the same or different in length compared to TxOP 550 (e.g., TxOP 550-*a* and/or TxOP 550-*b*). For example, in some cases, backoff duration 582 may have a length corresponding to a remainder of the duration of a TxOP 550 (e.g., TxOP 550-*a* and/or TxOP 550-*b*).

At 585, UE 115-*d* may transmit a pre-grant response message to base station 105-*g* via transmitter 545. Base station 105-*g* may receive the pre-grant message via receiver 530-*a*. At 565-*d*, receiver 530-*a* may trigger transmitter 520-*a* to perform downlink transmissions. At 590, base station 105-*g* may transmit data on one or more downlink transmissions to UE 115-*d* using transmitter 520-*a*. The data may be transmitted on one or more mmW band downlink transmit beams. The one or more mmW band downlink transmit beams may be transmitted by base station 105-*g* in a beamformed manner. UE 115-*d* may receive the data on one or more mmW band downlink reception beams via receiver 535. At 595, UE 115-*d* may transmit one or more ACK or NACK messages via transmitter 545 in response to receiving the downlink transmissions. Thus, process flow 500 provides a technique for UE 115-*d* to receive data from base station 105-*g* on a first RF spectrum band (e.g., mmW band downlink channel) and transmit messages (e.g., ACK, NACKs, pre-grant response, channel reservation signals, etc.) on a second RF spectrum band (e.g., sub-6 GHz band uplink channel). In addition, process flow 500 may provide techniques to provide higher data rates, improve transmission capacity, spectral efficiency, and enhance coexistence, while reducing interference amongst devices.

Figure 6:
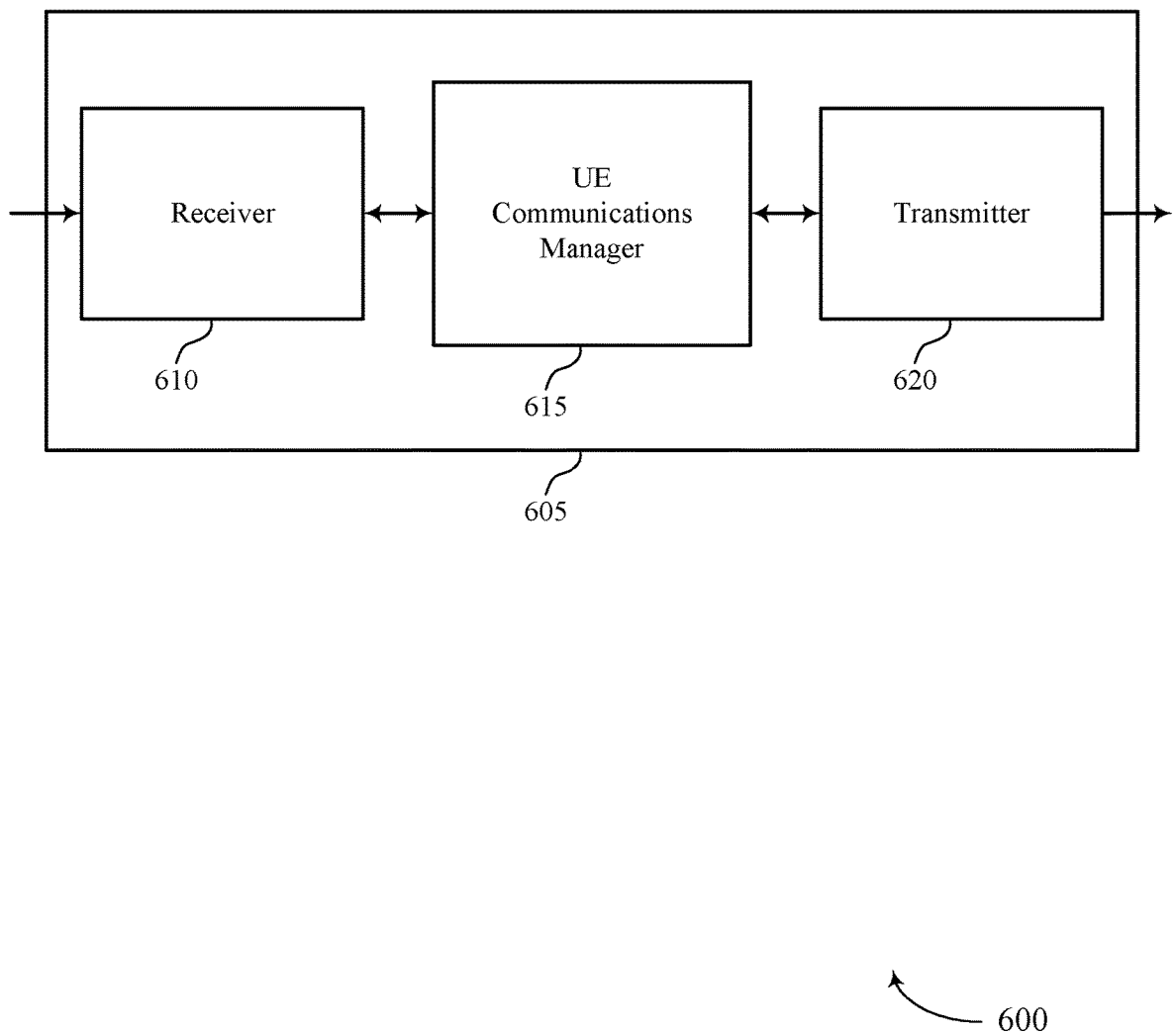
FIGS. 6 through 8 show block diagrams of a device that supports listen-before-talk and channel reservation for millimeter wave systems in accordance with aspects of the present disclosure.

FIG. 6 shows a block diagram 600 of a wireless device 605 that supports listen-before-talk and channel reservation for millimeter wave systems in accordance with aspects of the present disclosure. Wireless device 605 may be an example of aspects of a UE 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to listen-before-talk and channel reservation for millimeter wave systems, etc.). Information may be passed on to other components of the device. The receiver 610 may be an example of aspects of the transceiver 935 described with reference to FIG. 9. The receiver 610 may utilize a single antenna or a set of antennas.

UE communications manager 615 may be an example of aspects of the UE communications manager 915 described with reference to FIG. 9. UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may receive, from a base station, a pre-grant message indicating that a downlink transmission is available for transmission to the UE, where the downlink transmission is available for transmission on a first RF spectrum band; perform a LBT procedure based on receiving the pre-grant message, transmit, based on the LBT procedure indicating a clear channel, a channel reservation signal on a second RF spectrum band; and transmit, to the base station, a response to the pre-grant message on the second RF spectrum band. In some cases, transmissions from UE communications manager 615 are transmitted in a spectrum band other than the first spectrum band based at least in part on lacking an uplink transmission capability in the first spectrum band.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
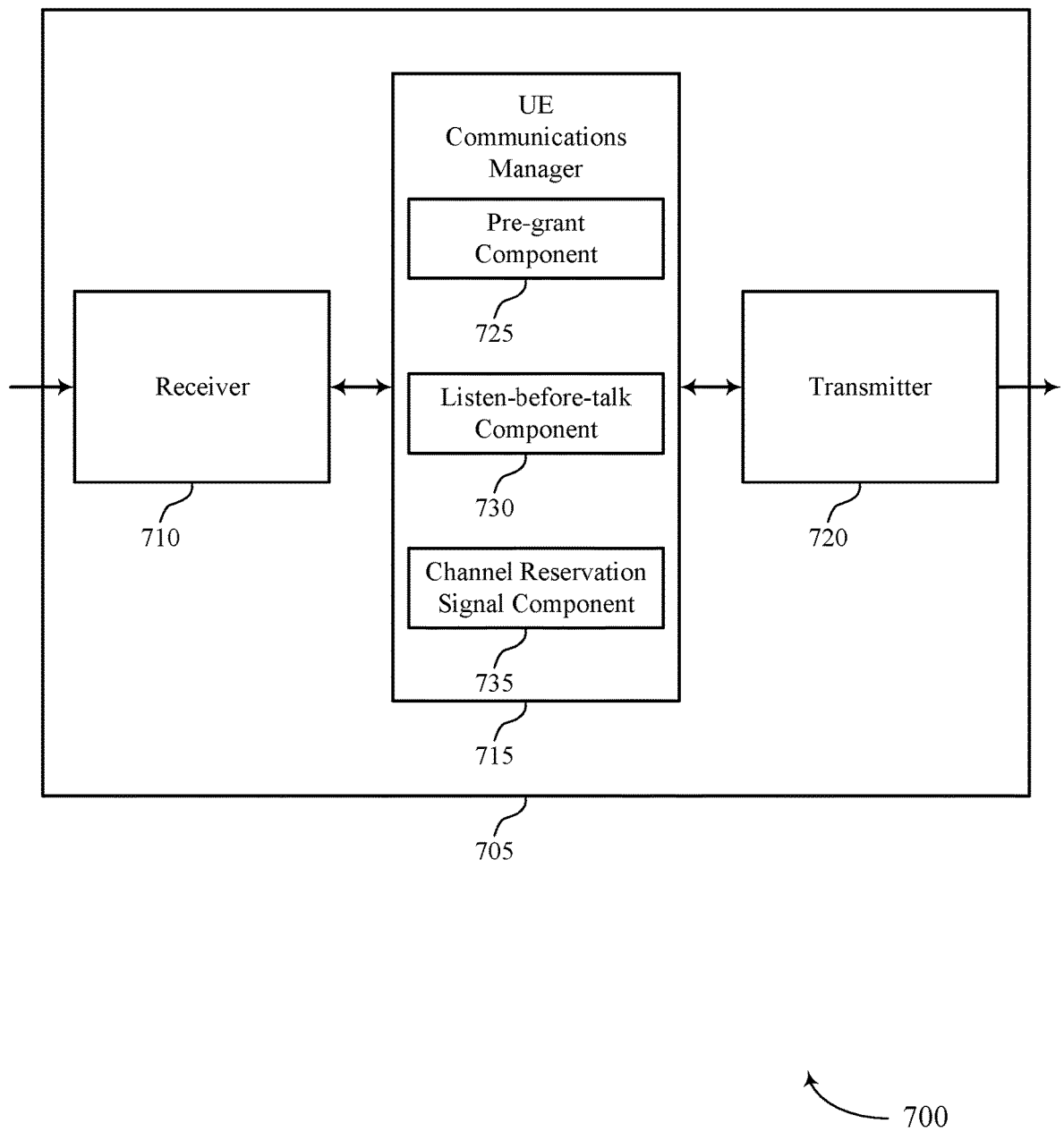

FIG. 7 shows a block diagram 700 of a wireless device 705 that supports listen-before-talk and channel reservation for millimeter wave systems in accordance with aspects of the present disclosure. Wireless device 705 may be an example of aspects of a wireless device 605 or a UE 115 as described with reference to FIG. 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to listen-before-talk and channel reservation for millimeter wave systems, etc.). Information may be passed on to other components of the device. The receiver 710 may be an example of aspects of the transceiver 935 described with reference to FIG. 9. The receiver 710 may utilize a single antenna or a set of antennas.

UE communications manager 715 may be an example of aspects of the UE communications manager 915 described with reference to FIG. 9. UE communications manager 715 may also include pre-grant component 725, listen-before-talk component 730, and channel reservation signal component 735.

Pre-grant component 725 may receive, from a base station, a pre-grant message indicating that a downlink transmission is available for transmission to the UE 115, where the downlink transmission is available for transmission on a first RF spectrum band. Pre-grant component 725 may transmit, to the base station, a response to the pre-grant message on the second RF spectrum band. Pre-grant component 725 may receive the downlink transmission from the base station on the first RF spectrum band. The downlink transmission may be transmitted by the base station using one or more of a set of transmit beams on the first RF spectrum band. Pre-grant component 725 may transmit, to the base station on the second RF spectrum band, one or more ACK or NACK messages in response to receiving the downlink transmission at the UE 115. In some cases, the pre-grant message is received in the first RF spectrum or the second RF spectrum. In some cases, the pre-grant message indicates a duration for a TxOP. In some cases, the channel reservation signal includes a preamble indicating the duration. In some cases, the first RF spectrum band includes a RF spectrum band above 6 GHz and the second RF spectrum band includes a RF spectrum band below 6 GHz. In some cases, the first RF spectrum band includes an unlicensed or a shared access RF spectrum band and the second RF spectrum band includes an unlicensed or a shared access RF spectrum band or the licensed RF spectrum band. In some cases, the second RF spectrum band includes the licensed RF spectrum band, where the licensed RF spectrum band includes an FDD licensed or TDD licensed spectrum band. In some cases, transmissions from pre-grant component 725 are transmitted in a spectrum band other than the first spectrum band based at least in part on lacking an uplink transmission capability in the first spectrum band.

Listen-before-talk component 730 may perform an LBT procedure based on receiving the pre-grant message. Listen-before-talk component 730 may perform the LBT procedure in the first RF spectrum band based on receiving the pre-grant message. Listen-before-talk component 730 may perform the LBT procedure in the second RF spectrum band based on receiving the pre-grant message. Listen-before-talk component 730 may perform a second LBT procedure in the second RF spectrum band. In some cases, transmitting the channel reservation signal is based on the LBT procedure indicating the clear channel and the second LBT procedure indicating a second clear channel. In some cases, the LBT procedure includes a category 4 LBT, or a one-shot LBT, or a combination thereof.

Channel reservation signal component 735 may transmit, based on the LBT procedure indicating a clear channel, a channel reservation signal on a second RF spectrum band. In some cases, the channel reservation transmission is a PUCCH waveform. In some cases, transmissions from channel reservation signal component 735 are transmitted in a spectrum band other than the first spectrum band based at least in part on lacking an uplink transmission capability in the first spectrum band.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
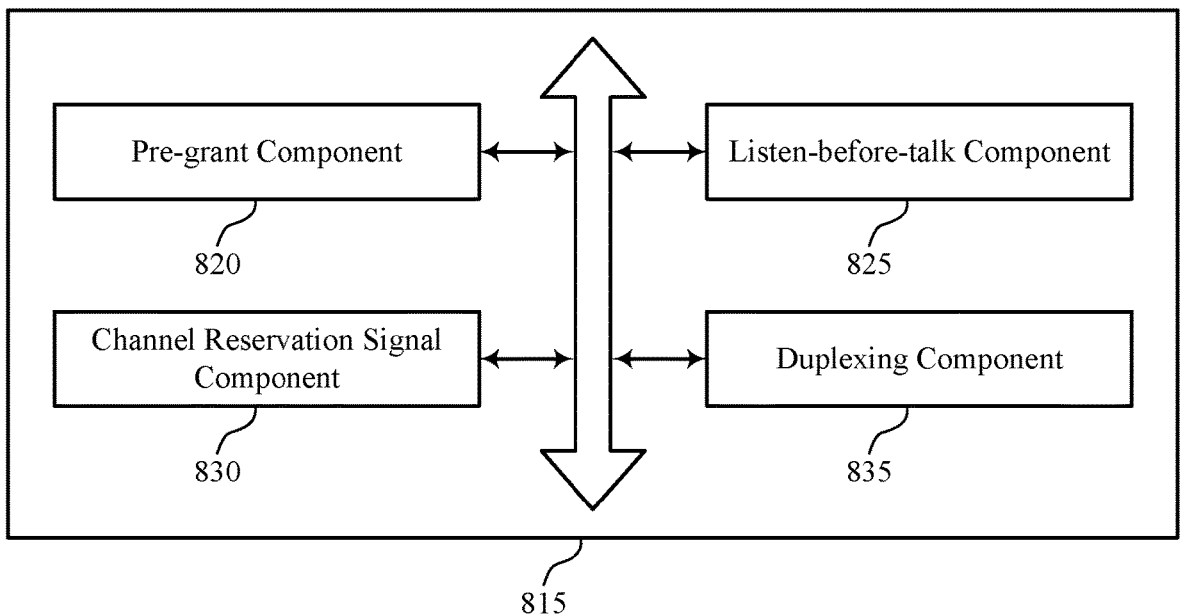

FIG. 8 shows a block diagram 800 of a UE communications manager 815 that supports listen-before-talk and channel reservation for millimeter wave systems in accordance with aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include pre-grant component 820, listen-before-talk component 825, channel reservation signal component 830, and duplexing component 835. Each of these modules may communicate, directly or indirectly, with one another (e.g., via one or more buses).

Pre-grant component 820 may receive, from a base station, a pre-grant message indicating that a downlink transmission is available for transmission to the UE 115, where the downlink transmission is available for transmission on a first RF spectrum band. Pre-grant component 820 may transmit, to the base station, a response to the pre-grant message on the second RF spectrum band. Pre-grant component 820 may receive the downlink transmission from the base station on the first RF spectrum band, the downlink transmission transmitted by the base station using one or more of a set of transmit beams on the first RF spectrum band. Pre-grant component 820 may transmit, to the base station on the second RF spectrum band, one or more ACK or NACK messages in response to receiving the downlink transmission at the UE 115. In some cases, the pre-grant message is received in the first RF spectrum or the second RF spectrum. In some cases, the pre-grant message indicates a duration for a TxOP. In some cases, the channel reservation signal includes a preamble indicating the duration. In some cases, the first RF spectrum band includes a RF spectrum band above 6 GHz and the second RF spectrum band includes a RF spectrum band below 6 GHz. In some cases, the first RF spectrum band includes an unlicensed or a shared access RF spectrum band and the second RF spectrum band includes an unlicensed or a shared access RF spectrum band or the licensed RF spectrum band. In some cases, the second RF spectrum band includes the licensed RF spectrum band, where the licensed RF spectrum band includes an FDD licensed or TDD licensed spectrum band. In some cases, transmissions from pre-grant component 820 are transmitted in a spectrum band other than the first spectrum band based at least in part on lacking an uplink transmission capability in the first spectrum band.

Listen-before-talk component 825 may perform an LBT procedure based on receiving the pre-grant message. Listen-before-talk component 825 may perform the LBT procedure in the first RF spectrum band based on receiving the pre-grant message. Listen-before-talk component 825 may perform the LBT procedure in the second RF spectrum band based on receiving the pre-grant message. Listen-before-talk component 825 may perform a second LBT procedure in the second RF spectrum band. In some cases, transmitting the channel reservation signal is based on the LBT procedure indicating the clear channel and the second LBT procedure indicating a second clear channel. In some cases, the LBT procedure includes a category 4 LBT, or a one-shot LBT, or a combination thereof.

Channel reservation signal component 830 may transmit, based on the LBT procedure indicating a clear channel, a channel reservation signal on a second RF spectrum band. In some cases, the channel reservation transmission is a PUCCH waveform. Duplexing component 835 may frequency division duplex an uplink carrier carrying the channel reservation signal and/or time division duplex an uplink carrier carrying the channel reservation signal. In some cases, transmissions from channel reservation signal component 830 are transmitted in a spectrum band other than the first spectrum band based at least in part on lacking an uplink transmission capability in the first spectrum band.

Figure 9:
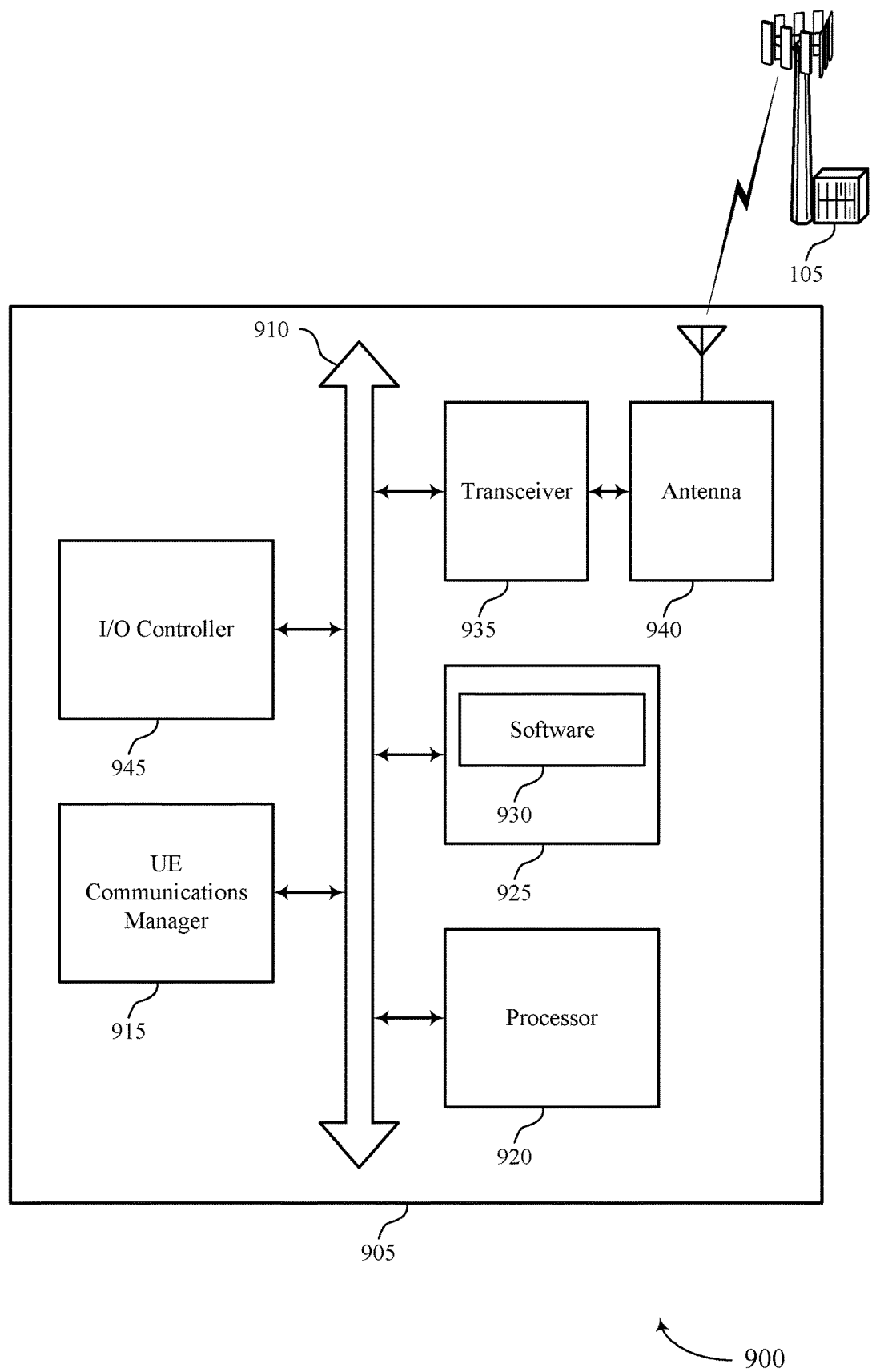
FIG. 9 illustrates a block diagram of a system including a UE that supports listen-before-talk and channel reservation for millimeter wave systems in accordance with aspects of the present disclosure.

FIG. 9 shows a diagram of a system 900 including a device 905 that supports listen-before-talk and channel reservation for millimeter wave systems in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting listen-before-talk and channel reservation for millimeter wave systems).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support listen-before-talk and channel reservation for millimeter wave systems. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas. In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
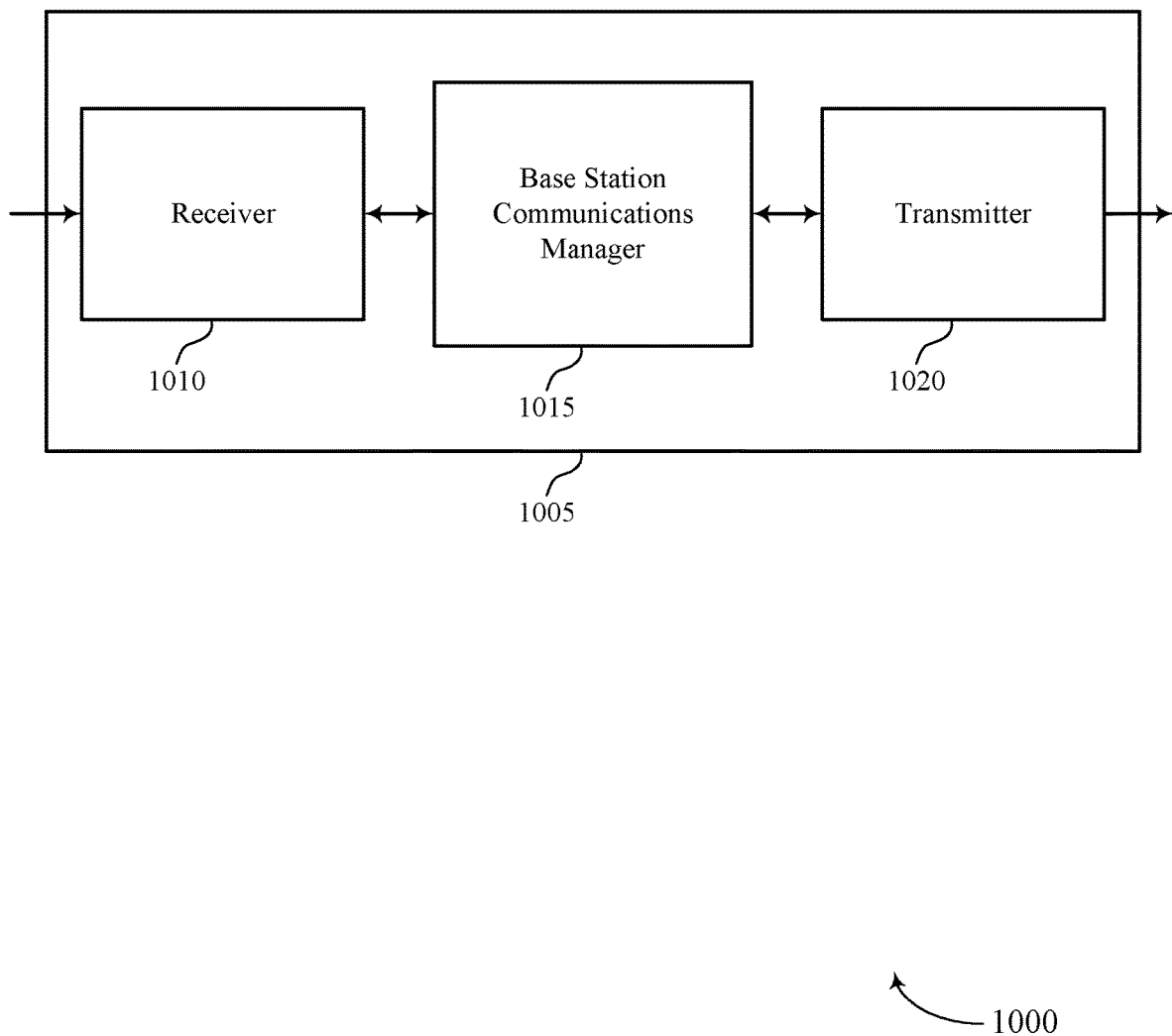
FIGS. 10 through 12 show block diagrams of a device that supports listen-before-talk and channel reservation for millimeter wave systems in accordance with aspects of the present disclosure.

FIG. 10 shows a block diagram 1000 of a wireless device 1005 that supports listen-before-talk and channel reservation for millimeter wave systems in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to listen-before-talk and channel reservation for millimeter wave systems, etc.). Information may be passed on to other components of the device. The receiver 1010 may be an example of aspects of the transceiver 1335 described with reference to FIG. 13. The receiver 1010 may utilize a single antenna or a set of antennas.

Base station communications manager 1015 may be an example of aspects of the base station communications manager 1315 described with reference to. Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. In some cases, transmissions received by base station communications manager 1015 are received in a spectrum band other than the first spectrum band based at least in part on lacking an uplink reception capability in the first spectrum band.

The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may transmit a pre-grant message to a UE 115 indicating that downlink transmission is available for transmission to the UE 115 on a first RF spectrum band; receive, from the UE 115, a response to the pre-grant message on a second RF spectrum band; and transmit, based on receiving the response to the pre-grant message, the downlink transmission to the UE 115 using one or more of a set of transmit beams on the first RF spectrum band.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to. The transmitter 1020 may utilize a single antenna or a set of antennas.

Figure 11:
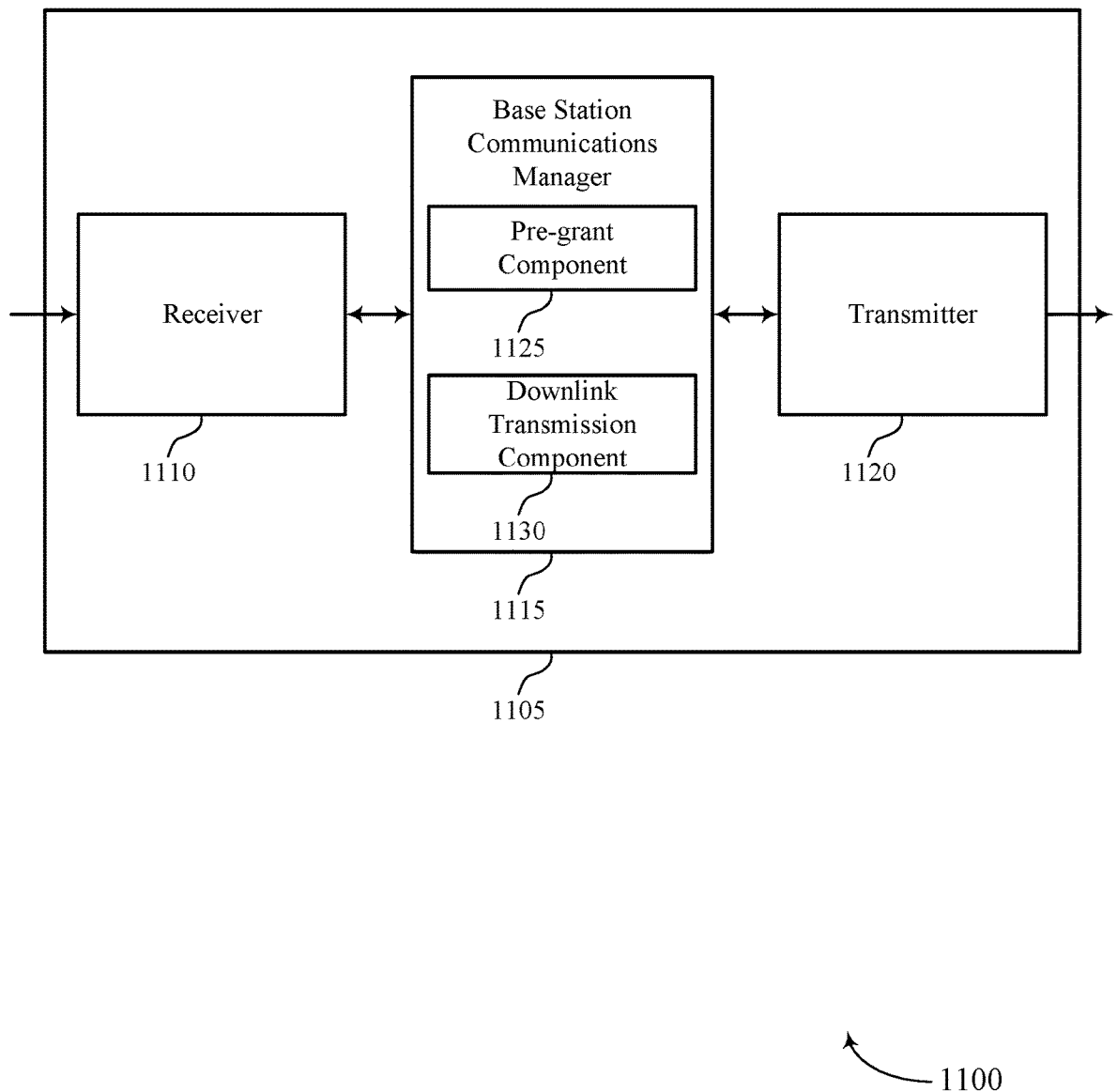

FIG. 11 shows a block diagram 1100 of a wireless device 1105 that supports listen-before-talk and channel reservation for millimeter wave systems in accordance with aspects of the present disclosure. Wireless device 1105 may be an example of aspects of a wireless device 1005 or a base station 105 as described with reference to FIG. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to listen-before-talk and channel reservation for millimeter wave systems, etc.). Information may be passed on to other components of the device. The receiver 1110 may be an example of aspects of the transceiver 1335 described with reference to. The receiver 1110 may utilize a single antenna or a set of antennas.

Base station communications manager 1115 may be an example of aspects of the base station communications manager 1315 described with reference to. Base station communications manager 1115 may also include pre-grant component 1125 and downlink transmission component 1130.

Pre-grant component 1125 may transmit a pre-grant message to a UE 115 indicating that downlink transmission is available for transmission to the UE 115, where the downlink transmission is available for transmission on a first RF spectrum band. Pre-grant component 1125 may receive, from the UE 115, a response to the pre-grant message on a second RF spectrum band, transmit the pre-grant message to the UE 115 in the second RF spectrum band. Pre-grant component 1125 may transmit the pre-grant message to the UE 115 in the first RF spectrum band or the second RF spectrum band. In some cases, the pre-grant message indicates a duration for a TxOP. In some cases, the first RF spectrum band includes a RF spectrum band above 6 GHz and the second RF spectrum band includes a RF spectrum band below 6 GHz. In some cases, the first RF spectrum band includes an unlicensed or a shared access RF spectrum band and the second RF spectrum band includes an unlicensed or a shared access RF spectrum band or the licensed RF spectrum band. In some cases, the second RF spectrum band comprises the licensed RF spectrum band, where the licensed RF spectrum band includes an FDD licensed or TDD licensed spectrum band. In some cases, the pre-grant message is transmitted without performing an LBT procedure to indicate a clear channel for the pre-grant message transmission. In some cases, transmissions received by pre-grant component 1125 are received in a spectrum band other than the first spectrum band based at least in part on lacking an uplink reception capability in the first spectrum band.

Downlink transmission component 1130 may transmit, based on receiving the response to the pre-grant message, the downlink transmission to the UE 115 using one or more of a set of transmit beams on the first RF spectrum band and receive, from the UE 115 on the second RF spectrum band, one or more ACK or NACK messages in response to transmitting the downlink transmission to the UE 115. In some cases, transmissions received by downlink transmission component 1130 are received in a spectrum band other than the first spectrum band based at least in part on lacking an uplink reception capability in the first spectrum band.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to. The transmitter 1120 may utilize a single antenna or a set of antennas.

Figure 12:
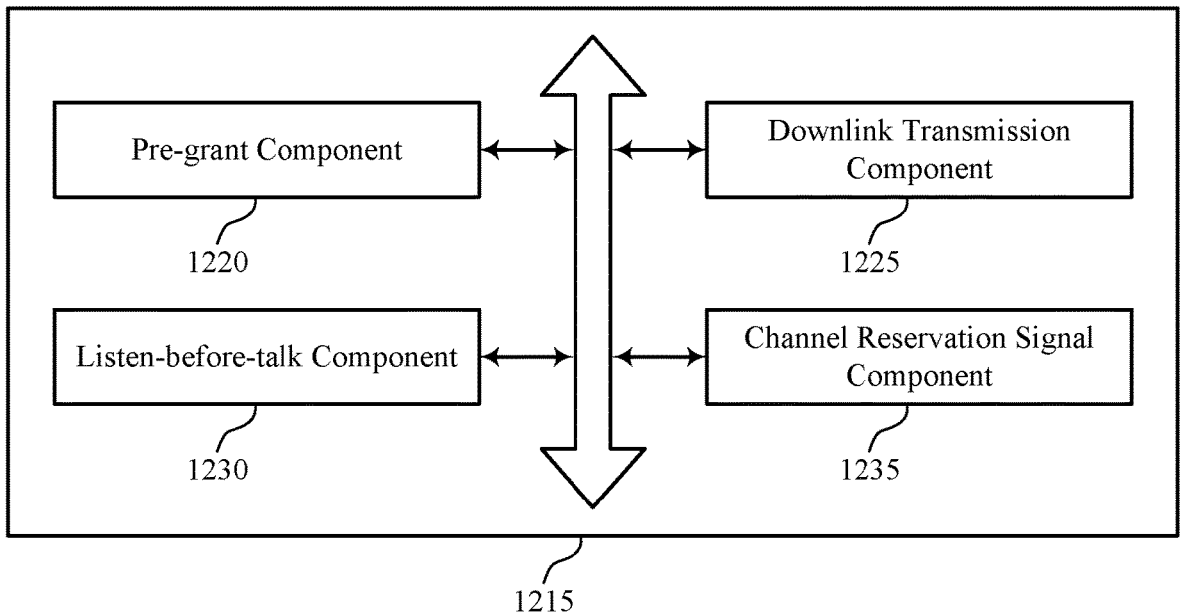

FIG. 12 shows a block diagram 1200 of a base station communications manager 1215 that supports listen-before-talk and channel reservation for millimeter wave systems in accordance with aspects of the present disclosure. The base station communications manager 1215 may be an example of aspects of a base station communications manager 1315 described with reference to FIGS. 10, 11, and 13. The base station communications manager 1215 may include pre-grant component 1220, downlink transmission component 1225, listen-before-talk component 1230, and channel reservation signal component 1235. Each of these modules may communicate, directly or indirectly, with one another (e.g., via one or more buses).

Pre-grant component 1220 may transmit a pre-grant message to a UE 115 indicating that downlink transmission is available for transmission to the UE 115, where the downlink transmission is available for transmission on a first RF spectrum band. Pre-grant component 1220 may receive, from the UE 115, a response to the pre-grant message on a second RF spectrum band, transmit the pre-grant message to the UE 115 in the second RF spectrum band. Pre-grant component 1220 may transmit the pre-grant message to the UE 115 in the first RF spectrum band or the second RF spectrum band. In some cases, the pre-grant message indicates a duration for a TxOP. In some cases, the first RF spectrum band includes a RF spectrum band above 6 GHz and the second RF spectrum band includes a RF spectrum band below 6 GHz. In some cases, the first RF spectrum band includes an unlicensed or a shared access RF spectrum band and the second RF spectrum band includes an unlicensed or a shared access RF spectrum band or the licensed RF spectrum band. In some cases, the second RF spectrum band includes the licensed RF spectrum band, where the licensed RF spectrum band includes an FDD licensed or TDD licensed spectrum band. In some cases, the pre-grant message is transmitted without performing an LBT procedure to indicate a clear channel for the pre-grant message transmission. In some cases, transmissions received by pre-grant component 1220 are received in a spectrum band other than the first spectrum band based at least in part on lacking an uplink reception capability in the first spectrum band.

Downlink transmission component 1225 may transmit, based on receiving the response to the pre-grant message, the downlink transmission to the UE 115 using one or more of a set of transmit beams on the first RF spectrum band and may receive, from the UE 115 on the second RF spectrum band, one or more ACK or NACK messages in response to transmitting the downlink transmission to the UE 115. In some cases, transmissions received by downlink transmission component 1225 are received in a spectrum band other than the first spectrum band based at least in part on lacking an uplink reception capability in the first spectrum band.

Listen-before-talk component 1230 may perform an LBT procedure in the second RF spectrum band, where the pre-grant message is transmitted based on the LBT procedure indicating a clear channel.

Channel reservation signal component 1235 may receive, from a second UE 115, a channel reservation signal on the second RF spectrum band and refrain from transmitting on the first RF spectrum band based on receiving the channel reservation signal. In some cases, the channel reservation signal includes a preamble indicating a duration and the base station refrains from transmitting for the indicated duration. In some cases, the channel reservation transmission is a PUCCH waveform. In some cases, transmissions received by channel reservation component 1235 are received in a spectrum band other than the first spectrum band based at least in part on lacking an uplink reception capability in the first spectrum band.

Figure 13:
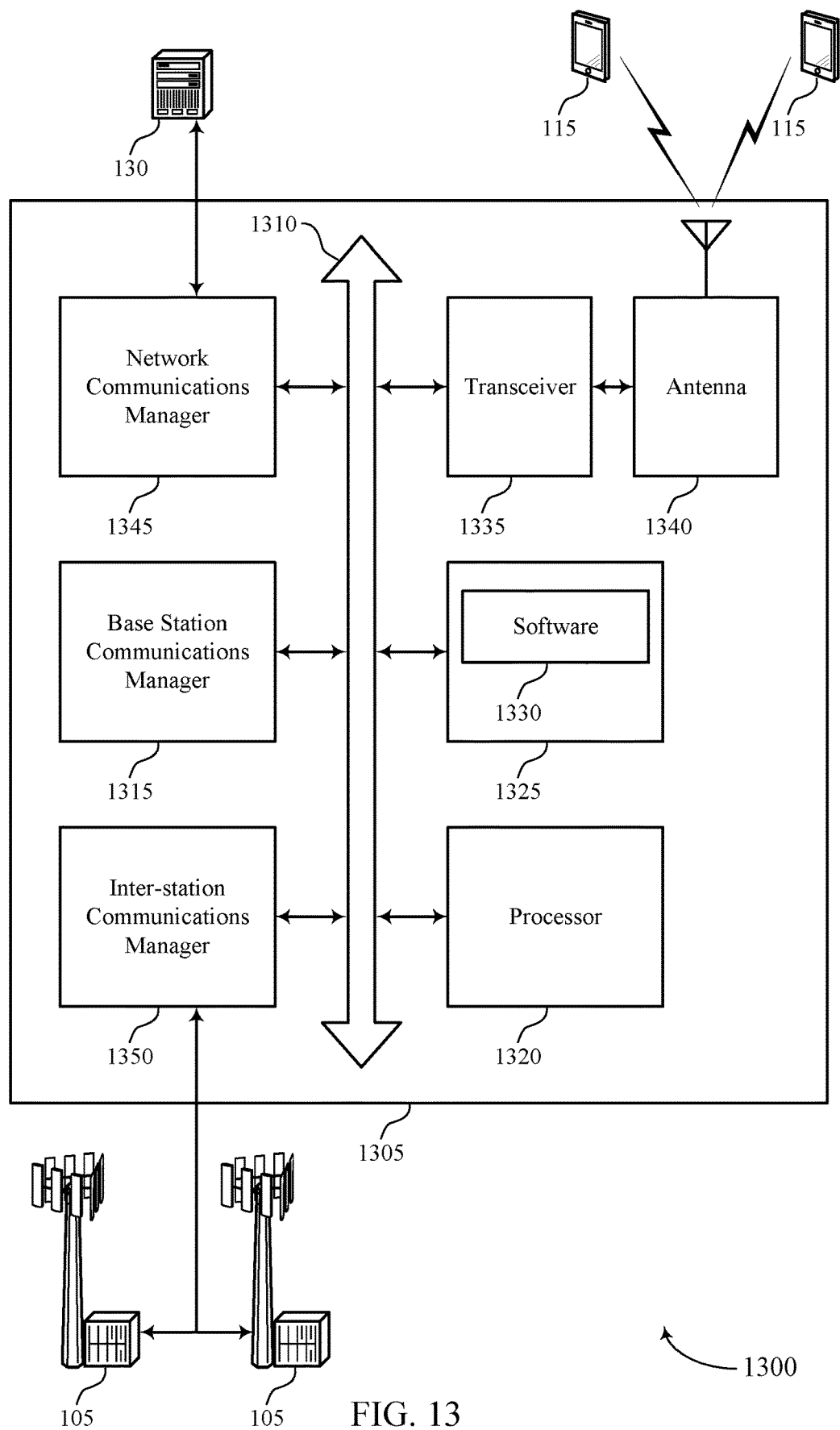
FIG. 13 illustrates a block diagram of a system including a base station that supports listen-before-talk and channel reservation for millimeter wave systems in accordance with aspects of the present disclosure.

FIG. 13 shows a diagram of a system 1300 including a device 1305 that supports listen-before-talk and channel reservation for millimeter wave systems in accordance with aspects of the present disclosure. Device 1305 may be an example of or include the components of base station 105 as described above, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting listen-before-talk and channel reservation for millimeter wave systems).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support listen-before-talk and channel reservation for millimeter wave systems. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas. In some cases, the wireless device may include a single antenna 1340. However, in some cases the device may have more than one antenna 1340, which may be capable of concurrently transmitting or receiving multiple wireless transmissions. Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105 and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within a Long Term Evolution (LTE)/LTE-A wireless communication network technology to provide communication between base stations 105

Figure 14:
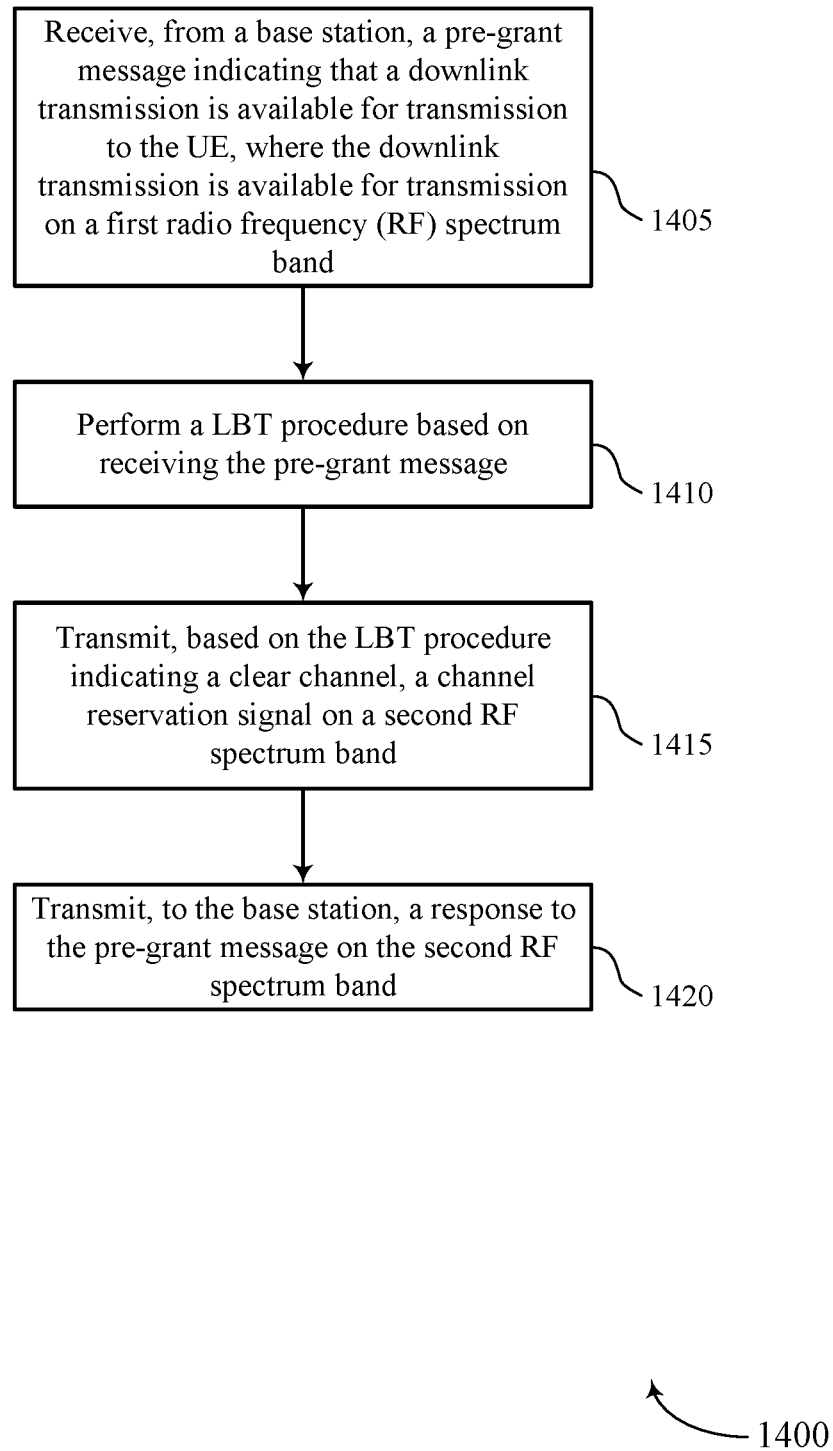
FIGS. 14 through 17 illustrate methods for listen-before-talk and channel reservation for millimeter wave systems in accordance with aspects of the present disclosure.

FIG. 14 shows a flowchart illustrating a method 1400 for listen-before-talk and channel reservation for millimeter wave systems in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may receive, from a base station, a pre-grant message indicating that a downlink transmission is available for transmission to the UE 115, where the downlink transmission is available for transmission on a first RF spectrum band. The operations of 1405 may be performed according to the methods described herein. In certain examples, aspects of the operations of 1405 may be performed by a pre-grant component as described with reference to FIGS. 6 through 9.

At 1410 the UE 115 may perform an LBT procedure based on receiving the pre-grant message. The operations of 1410 may be performed according to the methods described herein. In certain examples, aspects of the operations of 1410 may be performed by a listen-before-talk component as described with reference to FIGS. 6 through 9.

At 1415 the UE 115 may transmit, based on the LBT procedure indicating a clear channel, a channel reservation signal on a second RF spectrum band. The operations of 1415 may be performed according to the methods described herein. In certain examples, aspects of the operations of 1415 may be performed by a channel reservation signal component as described with reference to FIGS. 6 through 9.

At 1420 the UE 115 may transmit, to the base station, a response to the pre-grant message on the second RF spectrum band. The operations of 1420 may be performed according to the methods described herein. In certain examples, aspects of the operations of 1420 may be performed by a pre-grant component as described with reference to FIGS. 6 through 9.

Figure 15:
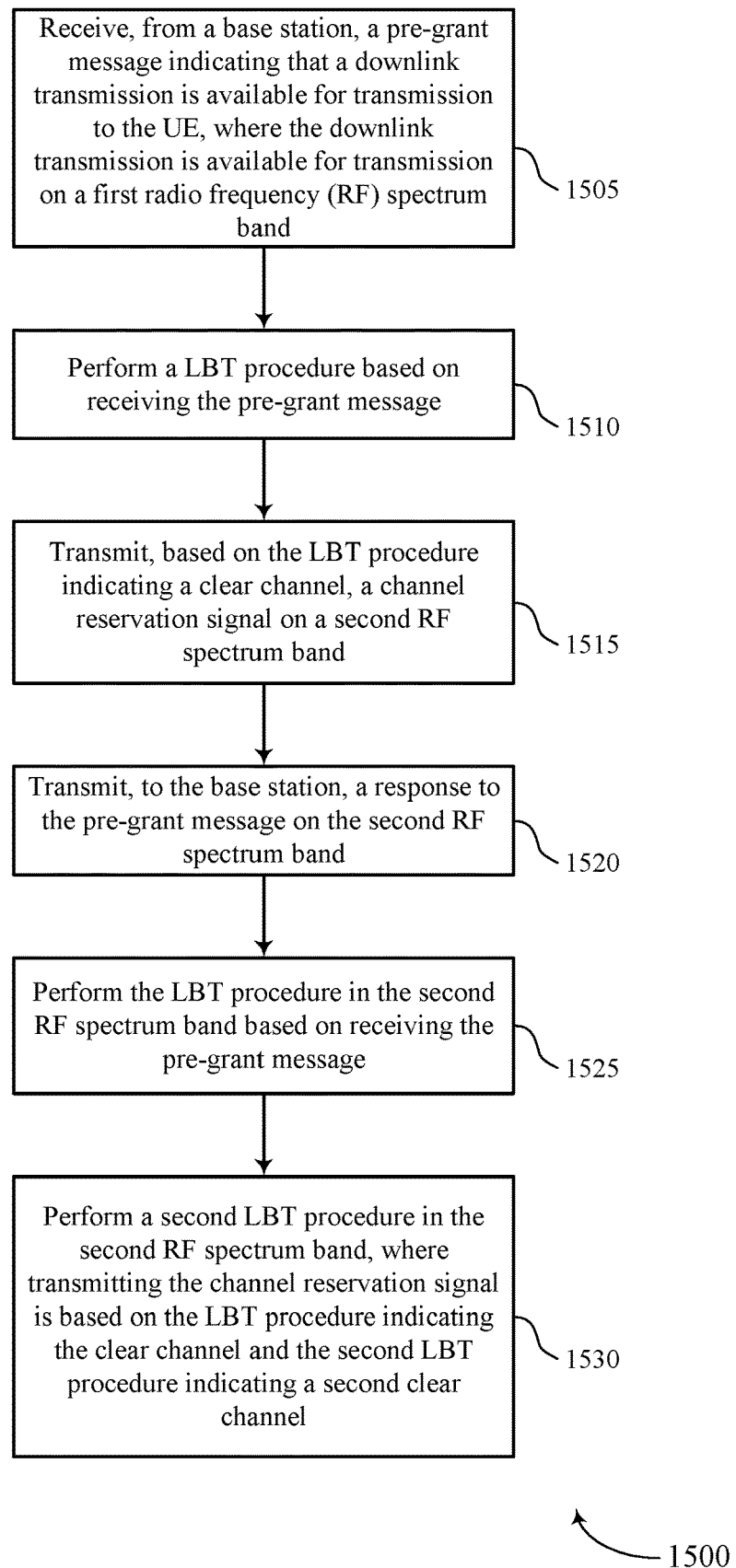

FIG. 15 shows a flowchart illustrating a method 1500 for listen-before-talk and channel reservation for millimeter wave systems in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may receive, from a base station, a pre-grant message indicating that a downlink transmission is available for transmission to the UE 115, where the downlink transmission is available for transmission on a first RF spectrum band. The operations of 1505 may be performed according to the methods described herein. In certain examples, aspects of the operations of 1505 may be performed by a pre-grant component as described with reference to FIGS. 6 through 9.

At 1510 the UE 115 may perform an LBT procedure based on receiving the pre-grant message. The operations of 1510 may be performed according to the methods described herein. In certain examples, aspects of the operations of 1510 may be performed by a listen-before-talk component as described with reference to FIGS. 6 through 9.

At 1515 the UE 115 may transmit, based on the LBT procedure indicating a clear channel, a channel reservation signal on a second RF spectrum band. The operations of 1515 may be performed according to the methods described herein. In certain examples, aspects of the operations of 1515 may be performed by a channel reservation signal component as described with reference to FIGS. 6 through 9.

At 1520 the UE 115 may transmit, to the base station, a response to the pre-grant message on the second RF spectrum band. The operations of 1520 may be performed according to the methods described herein. In certain examples, aspects of the operations of 1520 may be performed by a pre-grant component as described with reference to FIGS. 6 through 9.

At 1525 the UE 115 may perform the LBT procedure in the second RF spectrum band based on receiving the pre-grant message. The operations of 1525 may be performed according to the methods described herein. In certain examples, aspects of the operations of 1525 may be performed by a listen-before-talk component as described with reference to FIGS. 6 through 9.

At 1530 the UE 115 may perform a second LBT procedure in the second RF spectrum band, where transmitting the channel reservation signal is based on the LBT procedure indicating the clear channel and the second LBT procedure indicating a second clear channel. The operations of 1530 may be performed according to the methods described herein. In certain examples, aspects of the operations of 1530 may be performed by a listen-before-talk component as described with reference to FIGS. 6 through 9.

Figure 16:
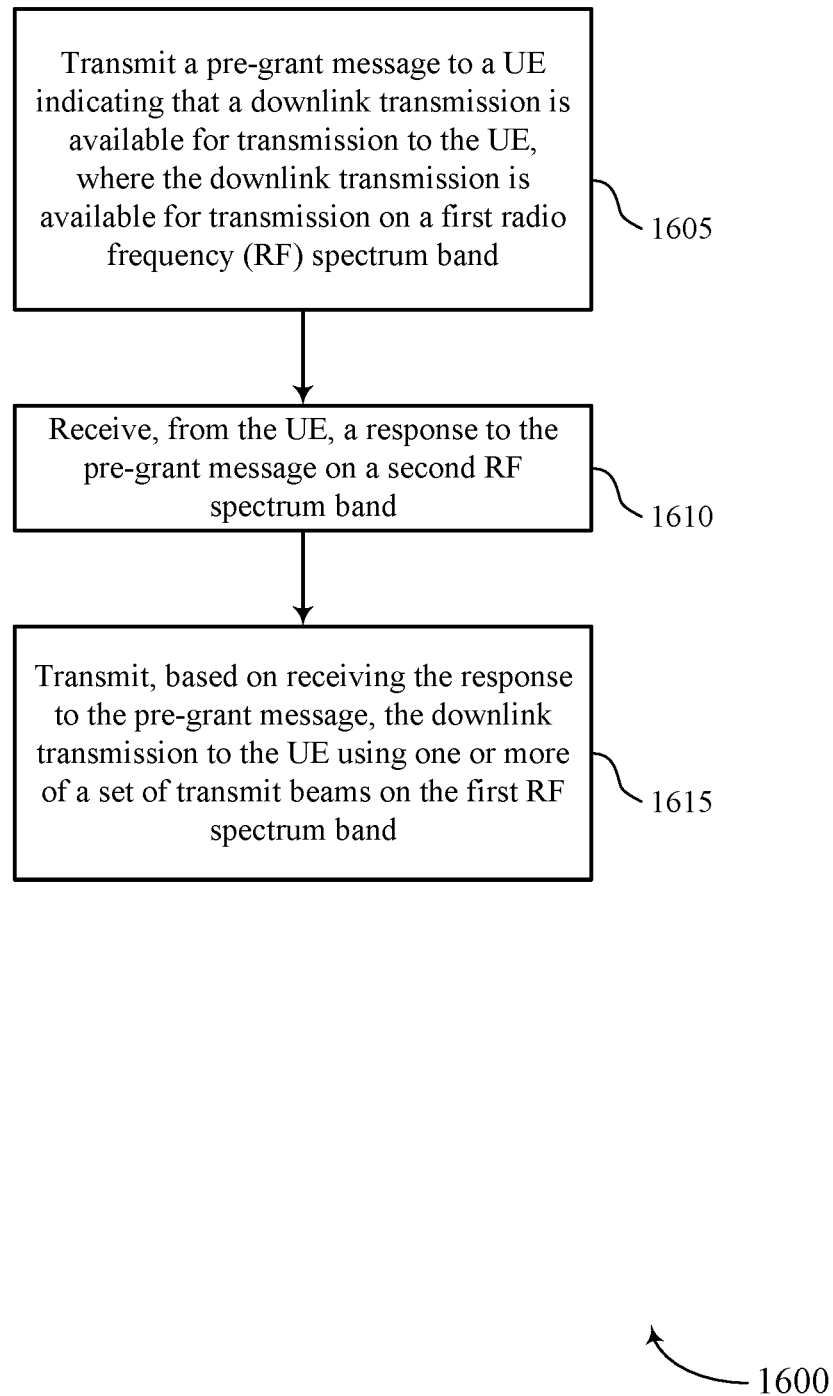

FIG. 16 shows a flowchart illustrating a method 1600 for listen-before-talk and channel reservation for millimeter wave systems in accordance with aspects of the present disclosure. The operations of method 1600 may be implemented by a base station 105 or its components as described herein. For example, the operations of method 1600 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1605 the base station 105 may transmit a pre-grant message to a UE 115 indicating that downlink transmission is available for transmission to the UE 115, where the downlink transmission is available for transmission on a first RF spectrum band. The operations of 1605 may be performed according to the methods described herein. In certain examples, aspects of the operations of 1605 may be performed by a pre-grant component as described with reference to FIGS. 10 through 13.

At 1610 the base station 105 may receive, from the UE 115, a response to the pre-grant message on a second RF spectrum band. The operations of 1610 may be performed according to the methods described herein. In certain examples, aspects of the operations of 1610 may be performed by a pre-grant component as described with reference to FIGS. 10 through 13.

At 1615 the base station 105 may transmit, based on receiving the response to the pre-grant message, the downlink transmission to the UE 115 using one or more of a set of transmit beams on the first RF spectrum band. The operations of 1615 may be performed according to the methods described herein. In certain examples, aspects of the operations of 1615 may be performed by a downlink transmission component as described with reference to FIGS. 10 through 13.

Figure 17:
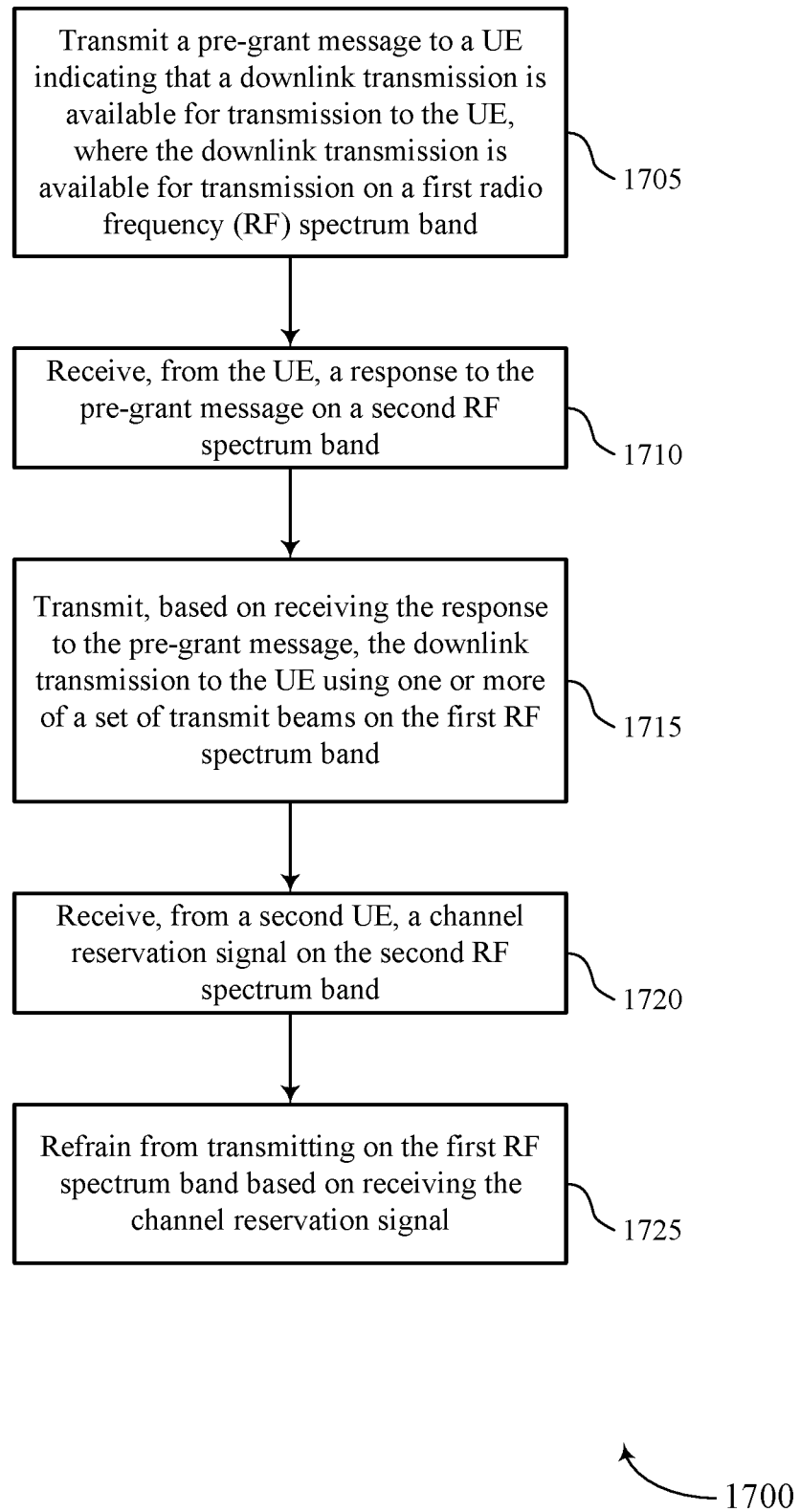

FIG. 17 shows a flowchart illustrating a method 1700 for listen-before-talk and channel reservation for millimeter wave systems in accordance with aspects of the present disclosure. The operations of method 1700 may be implemented by a base station 105 or its components as described herein. For example, the operations of method 1700 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1705 the base station 105 may transmit a pre-grant message to a UE 115 indicating that downlink transmission is available for transmission to the UE 115, where the downlink transmission is available for transmission on a first RF spectrum band. The operations of 1705 may be performed according to the methods described herein. In certain examples, aspects of the operations of 1705 may be performed by a pre-grant component as described with reference to FIGS. 10 through 13.

At 1710 the base station 105 may receive, from the UE 115, a response to the pre-grant message on a second RF spectrum band. The operations of 1710 may be performed according to the methods described herein. In certain examples, aspects of the operations of 1710 may be performed by a pre-grant component as described with reference to FIGS. 10 through 13.

At 1715 the base station 105 may transmit, based on receiving the response to the pre-grant message, the downlink transmission to the UE 115 using one or more of a set of transmit beams on the first RF spectrum band. The operations of 1715 may be performed according to the methods described herein. In certain examples, aspects of the operations of 1715 may be performed by a downlink transmission component as described with reference to FIGS. 10 through 13.

At 1720 the base station 105 may receive, from a second UE 115, a channel reservation signal on the second RF spectrum band. The operations of 1720 may be performed according to the methods described herein. In certain examples, aspects of the operations of 1720 may be performed by a channel reservation signal component as described with reference to FIGS. 10 through 13.

At 1725 the base station 105 may refrain from transmitting on the first RF spectrum band based on receiving the channel reservation signal. The operations of 1725 may be performed according to the methods described herein. In certain examples, aspects of the operations of 1725 may be performed by a channel reservation signal component as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples.

A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving, from a base station, a pre-grant message indicating that a downlink transmission is available for transmission to the UE on a first radio frequency (RF) spectrum band, wherein the first RF spectrum band comprises a RF spectrum band above 6 GHz;
    performing a listen-before-talk (LBT) procedure based at least in part on receiving the pre-grant message;
    transmitting, based at least in part on the LBT procedure indicating a clear channel, a channel reservation signal on a second RF spectrum band, wherein the second RF spectrum band comprises a RF spectrum band below 6 GHz; and
    transmitting, to the base station, a response to the pre-grant message on the second RF spectrum band.

2. The method of claim 1, wherein performing the LBT procedure comprises:
    performing the LBT procedure in the first RF spectrum band based at least in part on receiving the pre-grant message.

3. The method of claim 1, further comprising:
    receiving the downlink transmission from the base station on the first RF spectrum band, the downlink transmission transmitted by the base station using one or more of a set of transmit beams on the first RF spectrum band.

4. The method of claim 3, further comprising:
    transmitting, to the base station on the second RF spectrum band, one or more acknowledgement (ACK) or non-acknowledgment (NACK) messages in response to receiving the downlink transmission at the UE.

5. The method of claim 1, wherein receiving the pre-grant message comprises receiving in the first RF spectrum band or the second RF spectrum band.

6. The method of claim 1, wherein performing the LBT procedure comprises:
    performing the LBT procedure in the second RF spectrum band based at least in part on receiving the pre-grant message.

7. The method of claim 6, further comprising:
    performing a second LBT procedure in the second RF spectrum band, wherein transmitting the channel reservation signal is based at least in part on the LBT procedure indicating the clear channel and the second LBT procedure indicating a second clear channel.

8. The method of claim 1, wherein the pre-grant message indicates a duration for a transmission opportunity (TxOP).

9. The method of claim 8, wherein the channel reservation signal comprises a preamble indicating the duration.

10. The method of claim 1, wherein the LBT procedure comprises a category 4 LBT, or a one-shot LBT, or a combination thereof.

11. The method of claim 1, further comprising:
    frequency division duplexing an uplink carrier carrying the channel reservation signal.

12. The method of claim 1, further comprising:
    time division duplexing an uplink carrier carrying the channel reservation signal.

13. The method of claim 1, wherein the channel reservation transmission is a physical uplink control channel (PUCCH) waveform.

14. The method of claim 1, wherein:
the first RF spectrum band comprises an unlicensed or a shared access RF spectrum band; and
the second RF spectrum band comprises an unlicensed, or a shared access, or a licensed RF spectrum band.

15. The method of claim 14, wherein:
the second RF spectrum band comprises the licensed RF spectrum band, wherein the licensed RF spectrum band comprises a frequency division duplexing (FDD) licensed or time division duplexing (TDD) licensed spectrum band.

16. The method of claim 1, wherein:
transmissions from the UE are transmitted in a spectrum band other than the first RF spectrum band based at least in part on the base station lacking an uplink transmission capability in the first RF spectrum band.

17. An apparatus for wireless communication, comprising:
a processor;
memory in electronic communication with the processor; and
instructions stored in the memory and operable, when executed by the processor, to cause the apparatus to:
receive, from a base station, a pre-grant message indicating that a downlink transmission is available for transmission to the apparatus, wherein the downlink transmission is available for transmission on a first radio frequency (RF) spectrum band, wherein the first RF spectrum band comprises a RF spectrum band above 6 GHz;
perform a listen-before-talk (LBT) procedure based at least in part on receiving the pre-grant message;
transmit, based at least in part on the LBT procedure indicating a clear channel, a channel reservation signal on a second RF spectrum band, wherein the second RF spectrum band comprises a RF spectrum band below 6 GHz; and
transmit, to the base station, a response to the pre-grant message on the second RF spectrum band.

18. The apparatus of claim 17, wherein the instructions are further executable by the processor to:
perform the LBT procedure in the first RF spectrum band based at least in part on receiving the pre-grant message.

19. The apparatus of claim 17, wherein the instructions are further executable by the processor to:
receive the downlink transmission from the base station on the first RF spectrum band, the downlink transmission transmitted by the base station using one or more of a set of transmit beams on the first RF spectrum band.

20. The apparatus of claim 19, wherein the instructions are further executable by the processor to:
transmit, to the base station on the second RF spectrum band, one or more acknowledgement (ACK) or non-acknowledgment (NACK) messages in response to receiving the downlink transmission at the UE.

21. The apparatus of claim 17, wherein receiving the pre-grant message comprises receiving in the first RF spectrum band or the second RF spectrum band.

22. The apparatus of claim 17, wherein the instructions are further executable by the processor to:
perform the LBT procedure in the second RF spectrum band based at least in part on receiving the pre-grant message.

23. The apparatus of claim 22, wherein the instructions are further executable by the processor to:
perform a second LBT procedure in the second RF spectrum band, wherein transmitting the channel reservation signal is based at least in part on the LBT procedure indicating the clear channel and the second LBT procedure indicating a second clear channel.

24. The apparatus of claim 17, wherein the pre-grant message indicates a duration for a transmission opportunity (TxOP).

25. The apparatus of claim 24, wherein the channel reservation signal comprises a preamble indicating the duration.

26. The apparatus of claim 17, wherein the LBT procedure comprises a category 4 LBT, or a one-shot LBT, or a combination thereof.

27. An apparatus for wireless communication, comprising:
means for receiving, from a base station, a pre-grant message indicating that a downlink transmission is available for transmission to the apparatus, wherein the downlink transmission is available for transmission on a first radio frequency (RF) spectrum band, wherein the first RF spectrum band comprises a RF spectrum band above 6 GHz;
means for performing a listen-before-talk (LBT) procedure based at least in part on receiving the pre-grant message;
means for transmitting, based at least in part on the LBT procedure indicating a clear channel, a channel reservation signal on a second RF spectrum band, wherein the second RF spectrum band comprises a RF spectrum band below 6 GHz; and
means for transmitting, to the base station, a response to the pre-grant message on the second RF spectrum band.

28. A non-transitory computer readable medium storing code for wireless communication, the code comprising instructions executable by a processor to:
receive, from a base station, a pre-grant message indicating that a downlink transmission is available for transmission to the UE, wherein the downlink transmission is available for transmission on a first radio frequency (RF) spectrum band, the first RF spectrum band comprising a RF spectrum band above 6 GHz;
perform a listen-before-talk (LBT) procedure based at least in part on receiving the pre-grant message;
transmit, based at least in part on the LBT procedure indicating a clear channel, a channel reservation signal on a second RF spectrum band, the second RF spectrum band comprising a RF spectrum band below 6 GHz; and
transmit, to the base station, a response to the pre-grant message on the second RF spectrum band.

* * * * *